United States Patent [19]
Koshishiba et al.

[11] Patent Number: 5,761,390
[45] Date of Patent: Jun. 2, 1998

[54] ROBOT FOR REMOVING UNNECESSARY PORTION ON WORKPIECE

[75] Inventors: Eri Koshishiba, Yokohama; Koichi Sugimoto; Atsuko Hara, both of Hiratsuka; Masao Miki, Katsuta, all of Japan

[73] Assignee: Hitachi, Ltd., Tokyo, Japan

[21] Appl. No.: 987,158

[22] Filed: Dec. 8, 1992

[30] Foreign Application Priority Data

Dec. 12, 1991 [JP] Japan .................. 3-328536
Feb. 21, 1992 [JP] Japan .................. 4-035045
Mar. 9, 1992 [JP] Japan .................. 4-050750

[51] Int. Cl.$^6$ .............. G05B 19/42; G06F 15/46
[52] U.S. Cl. .................. 395/85; 395/86; 395/87; 395/89; 901/41
[58] Field of Search .................. 395/85, 89, 86, 395/87; 901/12, 41; 364/474.24; 29/DIG. 104

[56] References Cited

U.S. PATENT DOCUMENTS

| | | | |
|---|---|---|---|
| 4,590,578 | 5/1986 | Barto, Jr. et al. | 395/86 |
| 4,831,316 | 5/1989 | Ishiguro et al. | 395/89 |
| 4,899,095 | 2/1990 | Kishi et al. | 395/89 |
| 4,967,125 | 10/1990 | Hara | 395/87 |
| 4,967,365 | 10/1990 | Hampl et al. | 364/474.24 |
| 4,998,206 | 3/1991 | Jones et al. | 364/474.24 |
| 5,006,999 | 4/1991 | Kuno et al. | 395/87 |
| 5,053,976 | 10/1991 | Nose et al. | 395/86 |
| 5,115,400 | 5/1992 | Watanabe et al. | 364/474.24 |
| 5,129,044 | 7/1992 | Kashiwagi et al. | 395/86 |
| 5,148,372 | 9/1992 | Maiocco et al. | 364/474.24 |
| 5,150,506 | 9/1992 | Kotake et al. | 29/407 |
| 5,285,525 | 2/1994 | Nagoe et al. | 395/86 |
| 5,297,238 | 3/1994 | Wang et al. | 395/86 |

FOREIGN PATENT DOCUMENTS

| | | |
|---|---|---|
| 61-175775 | 8/1986 | Japan . |
| 63-58505 | 3/1988 | Japan . |
| 63-273912 | 11/1988 | Japan . |
| 2-274490 | 1/1990 | Japan . |
| 2-257310 | 10/1990 | Japan . |
| 3-34086 | 2/1991 | Japan . |

*Primary Examiner*—George B. Davis
*Attorney, Agent, or Firm*—Antonelli, Terry, Stout & Kraus, LLP

[57] ABSTRACT

A robot for removing an unnecessary portion on a workpiece, comprises a tool for removing the unnecessary portion, a tool positioning apparatus which contains a reference coordinate system, carries the tool attached thereon, and is movable to change a position and a posture of the tool in the reference coordinate system, a jig on which the workpiece is securely fixed to maintain a desired position and a desired posture of the workpiece with respect to the reference coordinate system of the tool positioning apparatus, and an arithmetic unit for calculating a movement path and a posture of the tool moved by the tool positioning apparatus on the basis of a position of the unnecessary portion on a desired shape of the workpiece, in which the arithmetic unit corrects the movement path and the posture of the tool not in accordance with the position of the unnecessary portion on the desired shape of the workpiece, but in accordance with a shape of at least one of the workpiece, the tool and the jig.

23 Claims, 24 Drawing Sheets

FIG. 4

```
PARTNO    / Wed Apr 10 15:22:13 1991
TOOLNO    / 1.000000 , 1.000000
INSERT    / JIGU                         ........(A)
INSERT    / 1.000000
INSERT    / JFACE                        ........(B)
INSERT    / 1.000000
INSERT    / PFACE                        ........(C)
INSERT    / 1.000000
INSERT    / PARTS NUM                    ........(D)
INSERT    / 1.000000
FROM      / 0.000000, 0.000000, 0.000000
CUTCOM    / LENGTH, OFF
CLAMP     / OFF
COOLNT    / OFF
SPINDL    / LOCK
AIR       / ON
SELCTL    / 1.000000
LOADTL    / 1.000000
INSERT    / VCSET                        ........(E)
INSERT    / 1.000000
INSERT    / CUTSIDE                      ........(F)
INSERT    / 1
INSERT    / CUTANGLE                     ........(G)
INSERT    / 45.000000
COMENT    / BAR11
CUTTER    / 0.000000,10.000000
AIR       / OFF
SPINDL    / 1000.000000,CLW
FEDRAT    / 50.000000
COOLNT    / OFF
CUTCOM    / LENGTH, ON ,OSETNO, 0.000000
RAPID              0.000000
GOLFT(LINE)/ 0.000000, 0.000000, -45.000000
RAPID
GOLFT(LINE)/ 72.104127, -40.000000,-45.000000
COOLNT    / ON , 1.000000
FEDRAT    / 10.000000
GOLFT(LINE)/ 72.104127,-40.000000,-48.000000    ........(H)
FEDRAT    / 50.000000
GOLFT(LINE) / 27.389833,-41.905770,-48.000000
GOLFT(ARC) / 22.945260,-58.493145,-48.000000    ........(I)
         center=(27.773075,-50.897606,-48.000000)  ........(J)
         radius = 9.000000
FEDRAT    / 10.000000                              ........(K)
GOLFT(LINE)/ 68.675116,-87.559589,-48.000000
COOLNT    / OFF
RAPID
GOLFT(LINE)/ 68.675116,-87.559589,-45.000000
GOHOME
SPINDL    / OFF
STOP
END
FINI
```

FIG.5

```
JIGU
1
JFACE
1
PFACE
1
PARTS NUM
1
UC
1
SIDECUT
R
ANGLECUT
30.000000
TOOL
9
MOVE
2
0 2
-41.320000  18.630000  73.000000      ········( Px, Py, Pz )
1.000000  0.000000  0.000000          ········( fx, fy, fz )
0.000000  1.000000  0.000000          ········( gx, gy, gz )
0.000000  0.000000  1.000000          ········( hx, hy, hz )
0.018630  0.044820  0.043000          ········( Px,  y, Pz )
1.000000  0.000000  0.000000
-0.000000  1.000000  0.000000                        .
0.000000  0.000000  1.000000                        .
CUT                                                 .
16
I  I  I  I  I  I  I  I  I  I  I  I  I  I
I  I  I  I  I  I  I  I  I  I  I  I  I  I
-41.320000  18.630000  43.000000      ······( Px, Py, Pz )
0.000000  1.000000  0.000000          ········( fx, fy, fz )
-1.000000  0.000000  0.000000         ········( gx, gy, gz )
0.000000  0.000000  1.000000          ········( hx, hy, hz )
0.000000  0.267949  -0.267949         ········( a , b , c )
-41.989873  21.130000  43.000000      ········( Px, Py, Pz )
-0.500000  0.866025  0.000000                        .
-0.866025  -0.500000  0.000000                       .
0.000000  0.000000  1.000000                         .
```

P1: PRESENT POSITION
P2: MOVEMENT TARGET POSITION

Pc : CIRCLE CENTER
P1 : PRESENT POSITION
P2 : MOVEMENT TARGET
     POSITION

PASSING POINT : Si
    (i=1,2,3...)

$Pc = (Pcx, Pcy, Pcz)$
$P0 = (P0x, P0y, P0z)$
$P1 = (P1x, Pcl, Pcz)$
$P2 = (P2x, P2y, P2z)$
$P3 = (P3x, P3y, P3z)$

FIG. 13
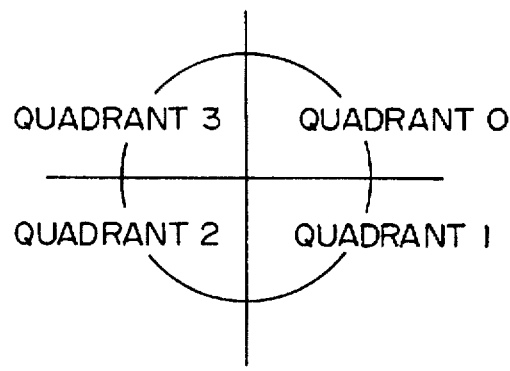
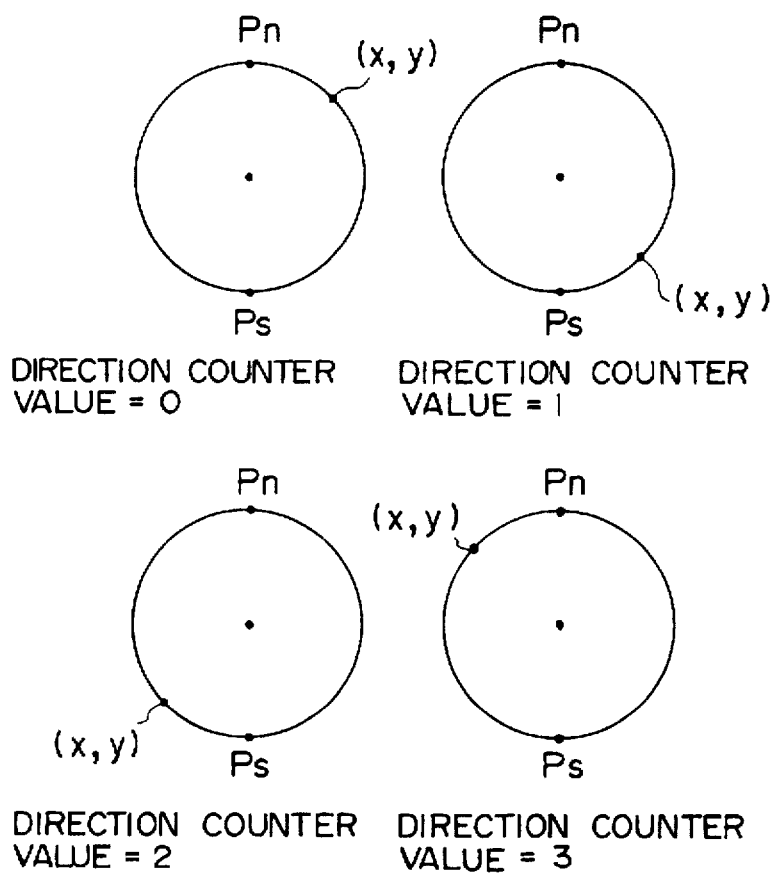

S1 ⟶ S1'
θ ROTATION

ARC ⇒ ARC

ARC ALONE

FIG. 21(A)   FIG. 21(B)   FIG. 21(C)
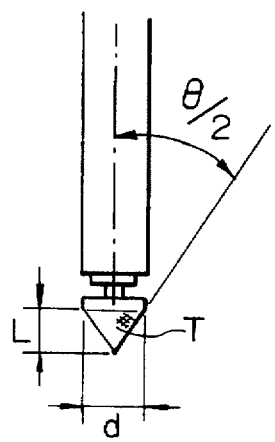
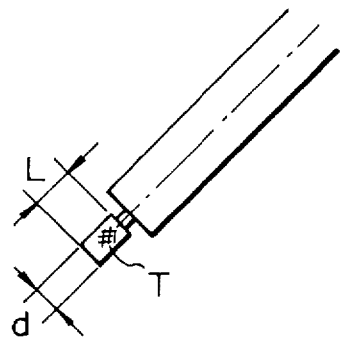
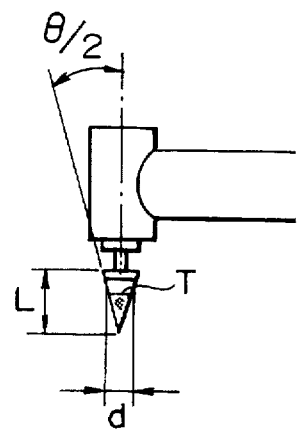
FIG. 22
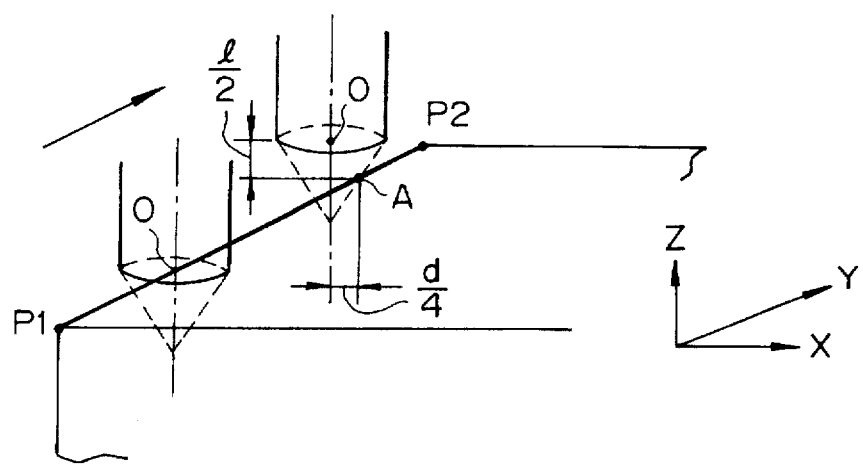

J : JIG COORDINATE SYSTEM

Jf1  
Jf2 } JIG SURFACE COORDINATE SYSTEM

B1  
B2 } WORKPIECE COORDINATE SYSTEM

Bf1  
Bf2 } WORKPIECE SURFACE COORDINATE SYSTEM

OUT $O_1$  $a_{y1}$  $b_{y1}$  $c_{y1}$  $a_{z1}$  $b_{z1}$  $c_{z1}$  $d_{x1}$  $d_{y1}$  $d_{z1}$ $O_2$  $a_{y2}$  $b_{y2}$  $c_{y2}$  $a_{z2}$  $b_{z2}$  $c_{z2}$  $d_{x2}$  $d_{y2}$  $d_{z2}$ $O_3$

ROBOT FOR REMOVING UNNECESSARY PORTION ON WORKPIECE

BACKGROUND OF THE INVENTION

The present invention relates to a robot for automatically removing an unnecessary portion on a workpiece.

In relation to the path instruction for a robot, for example, a technique disclosed in Japanese Patent Unexamined Publication No. 2-257310 has conventionally been known. With this technique, path instruction data are produced by manual operation of a teaching box. Alternatively, the robot is operated through manual guidance with a hand of an operator so that a tool will take a desired posture corresponding to a required position, and displacement positional data are collected from actuators in the robot, thereby producing path instruction data from the collected displacement positional data.

In relation to correction in accordance with a displacement of an operation object, for example, a technique is disclosed in Japanese Patent Unexamined Publication No. 2-274490. With this technique, corrections of positional and rotational displacements of a workpiece to be machined (an operation object) are conducted promptly. More specifically, a reference point is set on the workpiece, and amounts of the positional and rotational displacements of the workpiece on the robot coordinate system are obtained promptly on the basis of a difference between a positional vector of the reference point when there is no displacement and a positional vector of the reference point when there is a displacement.

Further, a technique in which a robot instruction position is defined on the basis of diagram information produced in a CAD system is disclosed in Japanese Patent Unexamined Publications Nos. 63-58505, 61-175775 and so forth. In this technique, the instruction position on a workpiece, which is a result of off-line definition from CAD data, is corrected on the basis of a positional displacement of the actual workpiece viewed from a camera. Moreover, Japanese Patent Unexamined Publication No. 63-273912 discloses a technique in which instruction data are produced from a robot, an object to be machined, a jig and so on while performing operational simulation of the robot, and the data are finally transformed into a robot language. Also, Japanese Patent Examined Publication No. 3-34086 discloses a technique in which a welding robot performs arc welding while vibrating a welding torch in a bevel widthwise direction, and detects and modifies a positional displacement of the welding torch during the vibration, and particularly, a method of operating the welding torch following an arcuate welding line.

OBJECT AND SUMMARY OF THE INVENTION

It is therefore an object of the present invention to provide a robot for automatically removing an unnecessary portion on a workpiece, which can precisely maintain a position and/or a posture of a tool for removing the unnecessary portion with respect to the unnecessary portion.

The invention provides a robot for removing an unnecessary portion on a workpiece, which comprises: a tool for removing the unnecessary portion; tool positioning means which contain a reference coordinate system, carry the tool attached thereon, and is movable to change a position and a posture of the tool in the reference coordinate system; jig means on which the workpiece is securely fixed to maintain a desired position and a desired posture of the workpiece with respect to the reference coordinate system of the tool positioning means; and arithmetic means for calculating a movement path and a posture of the tool moved by the tool positioning means on the basis of a position of the unnecessary portion on a desired shape of the workpiece, in which the arithmetic means correct the movement path and the posture of the tool in accordance with a shape or condition of at least one of the workpiece, the tool and the jig means other than the position of the unnecessary portion on the desired shape of the workpiece.

According to this invention, the movement path and the posture of the tool calculated on the basis of the position of the unnecessary portion on the desired shape of the workpiece are corrected in accordance with a shape or condition of at least one of the workpiece, the tool and the jig means other than the position of the unnecessary portion on the desired shape of the workpiece. Therefore, the position and/or posture relation between the tool and the unnecessary portion on the workpiece can be maintained at a desirable level, and the unnecessary portion can be removed by the tool precisely.

BRIEF DESCRIPTION OF THE DRAWINGS

FIG. 4 is a part of a CL file in which a position of an unnecessary portion on a workpiece and an access path of a tool toward the unnecessary portion are specified on a designed shape which is read out of a CAD system through a tool path defining program;

FIG. 5 is a part of a robot operation information file in which an unnecessary portion whose position is specified and a specified access path of a tool toward the unnecessary portion are divided into sections through a robot operation determining program, and positions of ends of the division sections are expressed in the form of sequences of points;

FIG. 13 contains schematic diagrams illustrative of classification of a point on a curved movement path on the basis of a coordinate system having a coordinate axis which contains a boundary point between a straight movement path and the curved movement path in the case where the tool is moved from the straight movement path to the curved movement path;

FIGS. 21 (A), 21 (B) and 21 (C) are schematic diagrams showing various tools used in the invention;

FIG. 22 is a schematic diagram illustrative of a relation between a boundary on a workpiece between an unnecessary portion to be removed and the rest of the workpiece (i.e., a virtual movement path of a tool or a desired designed shape of the workpiece) and an actual movement path of the tool;

DETAILED DESCRIPTION OF THE PREFERRED EMBODIMENTS

Figure 1:
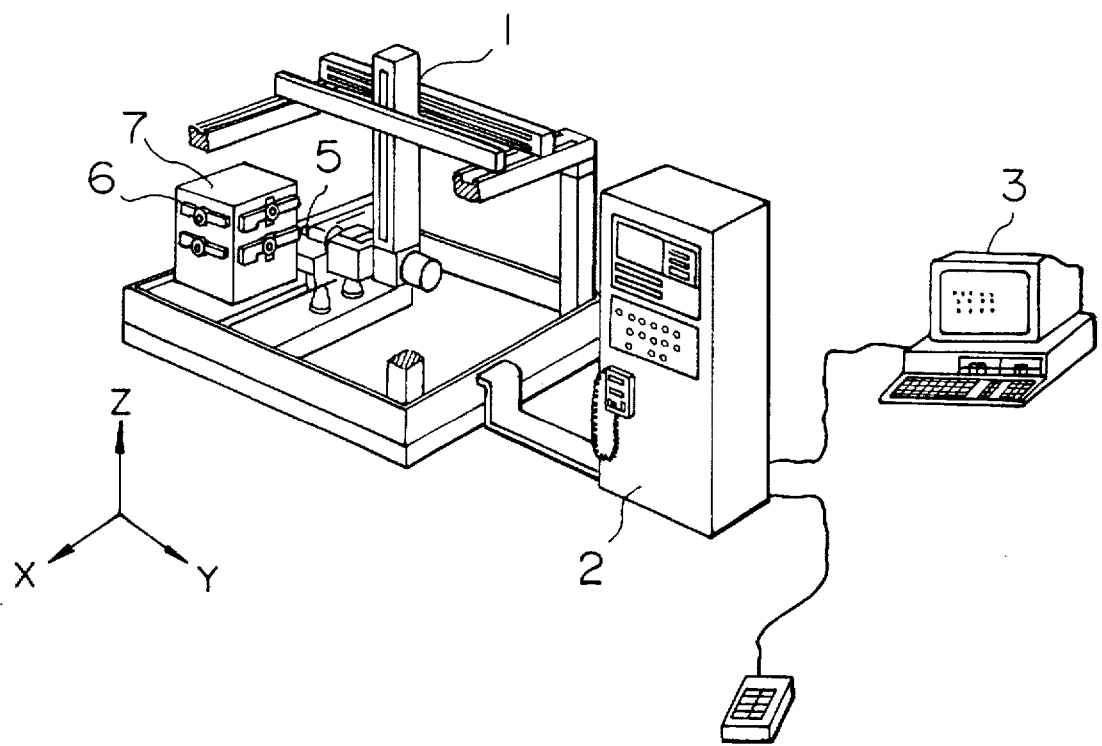
FIG. 1 is a schematic perspective view showing a robot according to the present invention.
Figure 2:
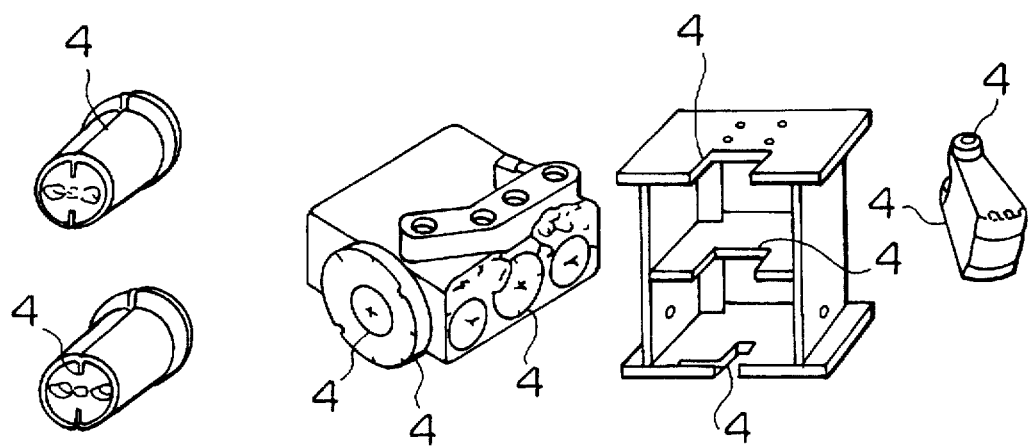
FIG. 2 is schematic perspective views showing workpieces from which unnecessary portions are removed by the robot according to the invention.

Workpieces to be machined by a robot according to the present invention will be described first. FIG. 2 shows examples of workpieces having free curved portions. In the drawing, ridgelines (lines where planes intersect) or holes of workpieces which are denoted by reference numerals 4 are portions where burrs (unnecessary portions) are formed. The invention will be fully explained with reference to a method of producing robot path data for removing burrs 4 shown in FIG. 2. FIG. 1 is an outer-appearance schematic view showing a burr removing robot, a controller for controlling the robot, a CRT, an input means and so forth. Robot path data used in this invention are inputted to the robot controller 2 by the input means 3, and the robot controller 2 operates the robot 1 on the basis of the robot path data inputted thereto. When a CPU of the robot controller 2 receives various kinds of input signals such as a robot start signal, the CPU controls the robot in accordance with a program stored in a program memory. This system includes a CRT for checking the input data and the output data of various kinds. A burr removing tool 5 is attracted, by air suction, to a distal end of a hand of the robot 1. Among tools of several kinds which are stored in a tool container (not shown), a desired one can be selected. A workpiece to be machined 6 is attached to a jig 7 which is 360° rotatable about the Z axis, and the origin of the jig coordinate system and the origin of the robot coordinate system are positioned accurately to have a certain relative positional relation.

Figure 3:
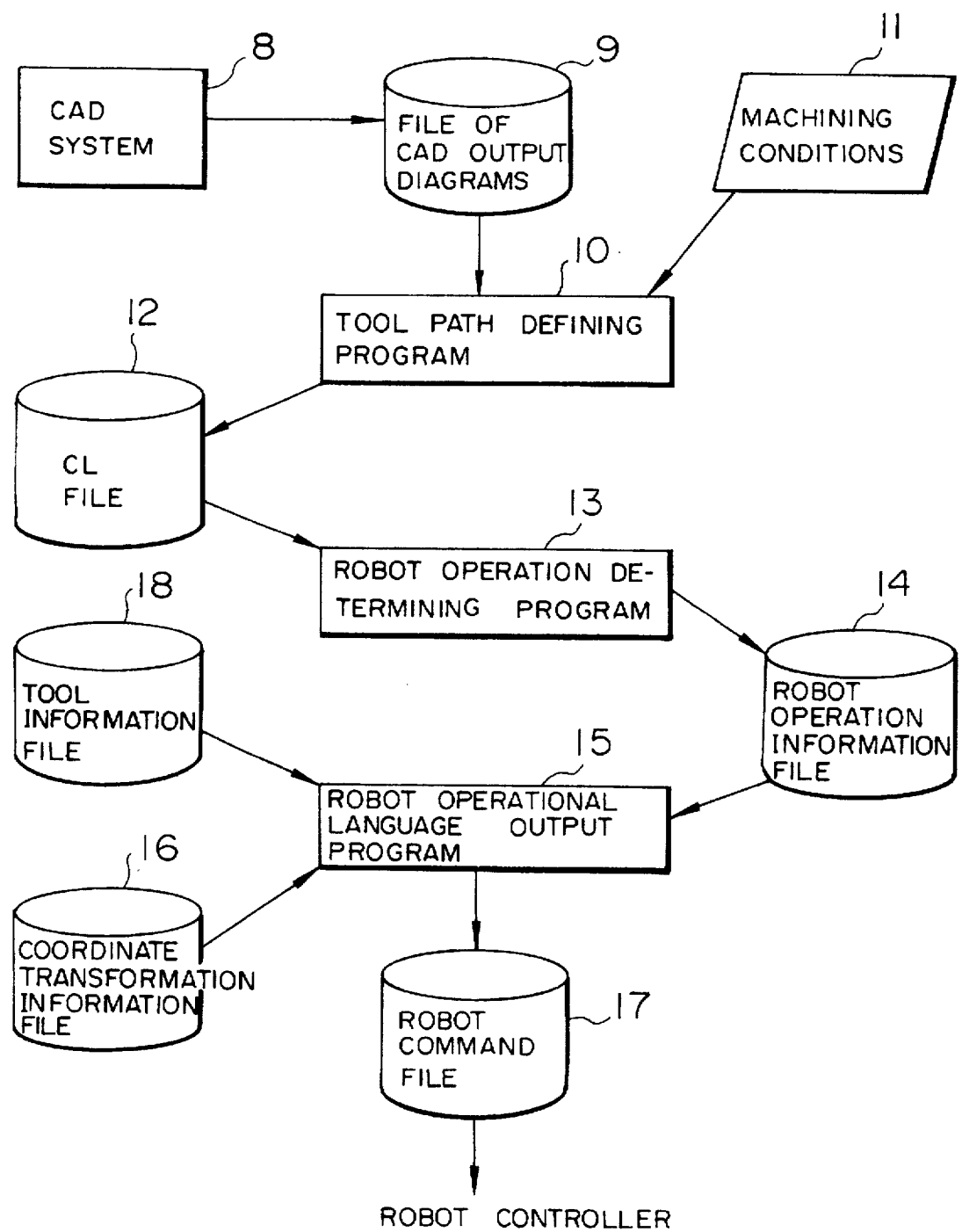
FIG. 3 is a conceptional view illustrative of a schematic chart of software for controlling the robot according to the invention.

Next, a data producing system mechanism for performing robot path definition will be described. FIG. 3 is a conceptional view illustrative of its schematic entire chart. In a CAD system 8, a diagram of a workpiece to be machined is drawn, and stored in a diagram file 9.

On the basis of data of the workpiece diagram stored in the diagram file g, a tool path defining program 11 determines a portion of a workpiece 6 where a tool (e.g., a grinder) 5 should remove burrs. This determination is conducted by displaying the workpiece diagram on the CRT and determining areas or line segments where burrs are formed on the workpiece diagram by means of a mouse or the like. A path of the tool (i.e., a course along a boundary between an unnecessary portion of a workpiece to be removed and the rest of the workpiece) is divided into a plurality of straight sections and arcuate sections. At this time, not only the portions of the workpiece from which burrs will be removed but also ways of operating the tool (moving the robot) before and after the burr removal are determined while referring to the graphic image. Also, a command for determining machining conditions such as coordinate transformation information, target chamfering angles, the tool numeral, and virtual compliance parameters (a viscosity constant C, a spring constant k, a mass m) is added to the determined information for indicating the areas or line segments where burrs are formed. Thus, a CL (Cutter Location) file shown in FIG. 4 is produced.

In this CL file, a command is written on each line, and its left portion separated from the rest by a slash '/' expresses the function of the command and is referred to as the subject.

The right portion serves as the predicate and is composed of terms for defining the function in detail. Since the above-mentioned coordinate transformation information, virtual compliance parameters, positioning of the grinding tool, and target chamfering angles are additional information, for example, 'INSERT' is written as the subject, and 'JIGU', 'JFACE', 'PFACE' and 'PARTS NUM' for coordinate transformation information, 'VCSET' for virtual compliance parameters, 'CUTSIDE' for positioning of the grinding tool, 'CUTANGLE' for target chamfering angles, are written as the predicate. As the coordinate transformation information, relations between a jig coordinate system, a jig surface coordinate system, a workpiece coordinate system, and a workpiece surface coordinate system must be defined. Consequently, the coordinate systems are referred to as 'JIGU', 'JFACE', 'PFACE' and 'PARTS NUM', respectively. Each of these coordinate systems includes a plurality of coordinate systems having different origins or the same origin, and the plurality of coordinate systems are discriminated from one another by numbering. For example, selection of a coordinate system of the jig surface which is one element of the jig surface coordinate system and designated by No. 1 is inputted to the CL file by writing as follows:

INSERT/JFACE

INSERT/1

'INSERT/1' in the second line expresses the matter which further specifies 'INSERT/JFACE' in the first line. Similar specifications are carried out in relation to the jig coordinate system, the workpiece coordinate system, and the workpiece surface coordinate system. The command for the workpiece coordinate system is 'PARTS NUM' because the workpiece coordinate system is concerned with inputting the number of workpieces. That is to say, when the number of workpieces is three, it means that attachment positions of three workpieces on the jig are predetermined, and that the workpieces respectively correspond to a plurality of coordinate systems which constitute the workpiece coordinate system. The command (E) of FIG. 4, which expresses a virtual compliance parameter for power control by means of a certain unit numeral, determines Unit No. 1, for example. The command (F) of FIG. 4 determines, in the subsequent line, 1 when grinding is effected on the right with respect to the advancing direction, and 0 when grinding is effected on the left with respect to the advancing direction. The command (G) of FIG. 4 expresses that a target surface chamfering angle is 45°.

A straight section of a free curve indicating a position of an unnecessary portion (a boundary between a portion to be removed and the rest of the workpiece) is expressed in the command (H) of FIG. 4 as follows:

GOLFT(LINE)/72.104127, –40.0, –48.0

The three values express coordinate values in the x, y and z directions from the origin of the diagram, specifying that a grinding portion of the tool in contact with the workpiece so as to remove the unnecessary portion is moved straight 72.104127, –40.0 and –48.0 (the unit is, e.g., mm) in the x, y and z directions, respectively, from the present position (the point where it has already reached). An arcuate section is expressed in the commands (I) to (K) as follows:

GOLFT(ARC)/22.945260, –58.493145, –48.0

Center=(27.773075, –50.897606, –48.0)

radius=9.0

They specify that the grinding portion of the tool is moved along an arc having a radius of 9.0 around the center (x=27.773075, y=–50.897606, z=–48.0) from the present position to a target position of x=22.94526, y=–58.493145, z=–48.0.

Next, a robot operation information file 14 is produced on the basis of CL data 12 through a robot operation determining program 13.

In the robot operation determining program 13, if a straight line is formed by the position of an unnecessary portion on the workpiece (a boundary between a portion to be removed and the rest of the workpiece, i.e., the path of the grinding portion of the tool) which is determined in the tool path defining program 10, a starting point and a terminal point of the straight line are automatically determined, and if an arc is formed, the path of the grinding portion of the tool is divided into a plurality of sections, and passing points on both each of these sections where the grinding portion of the tool must pass are automatically determined. Thus, the tool path is changed into a sequence of points and stored in the robot operation information file 14. Moreover, when it is changed into a sequence of points in the robot operation determining program 13, the robot not only is operated to move the tool but also must control the power for pressing the tool on the workpiece during actual burr-removal operation. Therefore, attribute data of the passing points are added about whether the tool passes each of the passing points while it is grinding (CUT) or while it is moving (MOVE), and also, attribute data of the passing points are added about whether each of the passing points is a point on the arc or not. FIG. 5 shows an example of such data writings.

A numeral written immediately after 'CUT' or 'MOVE' denotes the number of points. Further, in the case of 'CUT', 0 and 1 in the subsequent line express whether the points are on a straight line or on an arc. 0 and 1 in the next line express whether or not the points must be corrected in accordance with the tool.

Moreover, FIG. 5 shows that until the burr removal position in the tool path, the tool is first moved to a position (Px, Py, Pz) with a direction vector (Fx, Fy, Fz), (Gx, Gy, Gz), (Hx, Hy, Hz) indicating the posture of the tool.

In addition to the data inputted through the robot operation determining program 13, the coordinate transformation information, target chamfering angles, a shape, a size and an inclination angle of the tool to be used, the tool numeral, virtual compliance parameters for power control, and the attachment position of the jig, which are inputted through the tool path definition program 10, are stored, as data, in the robot operation information file 14.

In a robot operational language output program, on the basis of these data in the robot operation information file, a movement path of the origin of the tool is calculated from the position of the unnecessary portion (i.e., the path of the grinding portion of the tool) specified on the workpiece diagram which is data in the CL file, in comparison with data in a tool information file which indicate a shape of the grinding portion of the tool and a positional relation between the attachment position of the tool on the robot surface (the origin of the tool) and the grinding portion of the tool. While a tool movement speed and so forth are automatically determined, the data are transformed into coordinates in a robot coordinate system and outputted to a robot command file.

Figure 6:
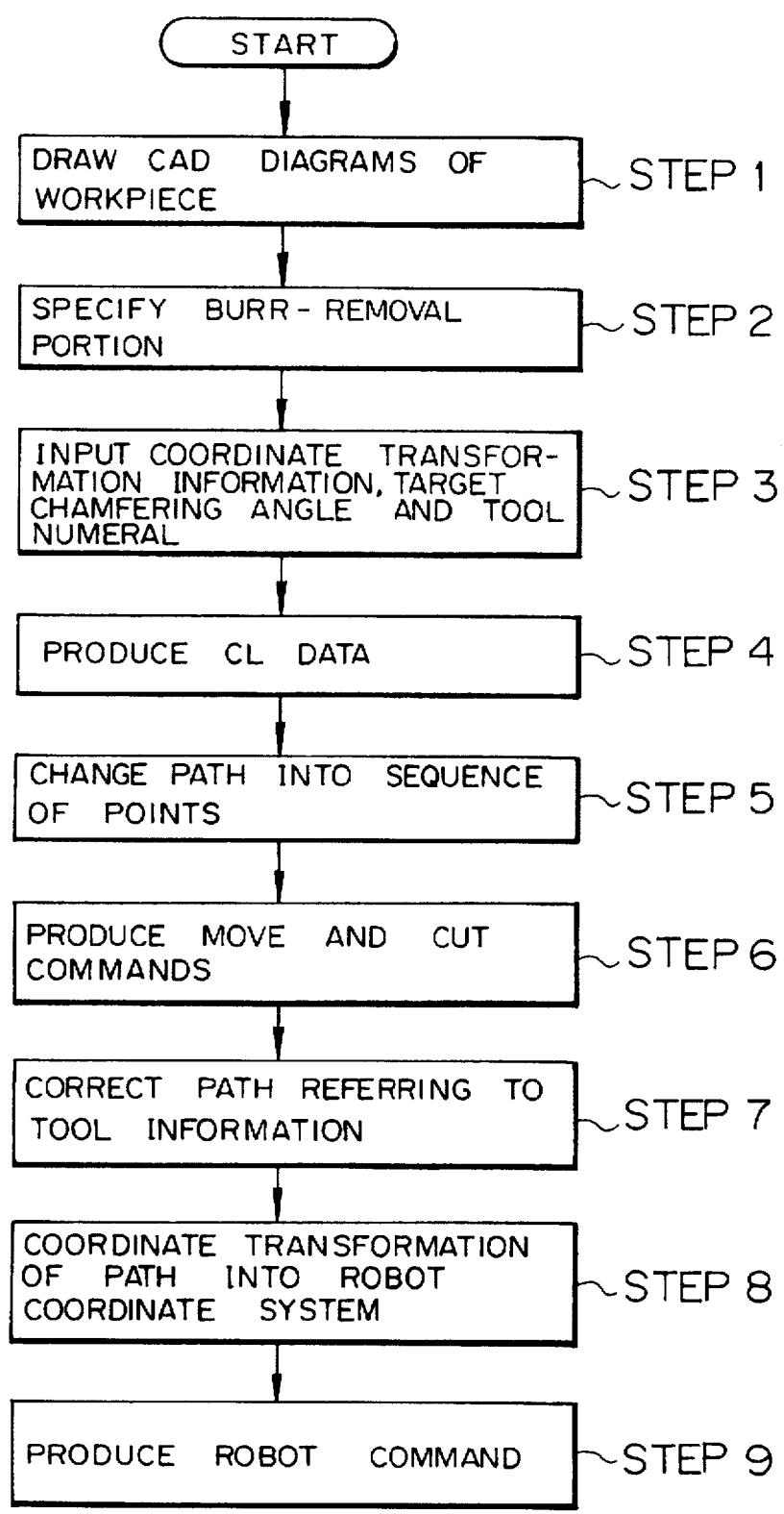
FIG. 6 is a flow chart illustrative of the schematic chart of software shown in FIG. 3.

The above-described processing flow is shown in FIG. 6.

In Step 1, a diagram of a workpiece to be machined is first drawn in the CAD system 8.

Next, in Step 2, the data of the workpiece diagram stored in the diagram file 9 are displayed on the CRT, and the tool path (the path of the grinding portion of the tool) is defined through the tool path definition program 10 by determining, by means of a mouse or the like, areas and line segments corresponding to the boundary between the unnecessary portion to be removed by the tool (e.g., a grinder) 5 and the rest of the workpiece in the workpiece diagram which shows a shape of the workpiece 6.

In Step 3, information other than the tool path defined from the diagram information of the workpiece is required for actually performing the burr removal operation through operational instruction to the robot 1. For example, when burrs are removed from the workpiece 6, a reaction force exerted on a power sensor which is attached on the tool 5 of the robot 1 is detected to effect virtual compliance control of a grinding force as a grinder torque, a feed speed of grinder rotation and so forth. Compliance parameters such as a viscosity constant C, a mass M and a spring constant K, target chamfering angles, and machining conditions such as the tool numeral which can specify information of the tool actually used such as the shape and the size, are added to the tool path data.

In Step 4, the CL file 10 is produced on the basis of the tool path defined in Step 2 and the machining condition information added in Step 3.

In Step 5, if the region on the workpiece (the tool path) which is specified in Step 2 is a straight line, a starting point and a terminal point of the straight line are automatically determined, and if it is an arc, a plurality of passing points which divide the arc into a plurality of sections are automatically determined. Thus, the tool path is changed into sequences of points, and coefficients of cubic functions expressing curves which are interpolated between the sequences of passing points are determined. This interpolation algorithm will be described later.

In Step 6, each of the passing points is discriminated whether the tool passes it while grinding (CUT) or while moving (MOVE), and the results are stored as attribute data of the passing points.

In Step 7, since the tool path (the path of the grinding portion of the tool) determined until Step 6 can be regarded as a course of a point of intersection between a rotational axis of the burr removing tool 5 and the workpiece (hereinafter referred to as a virtual center point $O_1$), as shown in FIG. 16, correction is performed in accordance with a diameter of the tool 5, and an angle for inclining the tool 5 which is a deviation between an inclination angle of the tool 5 and a target chamfering angle, and simultaneously, the path of the origin of the tool which is moved by the robot is calculated. Correction of the tool path will be described later.

In Step 8, workpieces are securely fixed on certain surfaces of the jig 7 which are predetermined for the respective workpieces, and burrs indicated on a workpiece surface of the workpiece 6 (a front view, a right side view and so on) are ground. Since the data of burr positions specified for each workpiece surface of the workpiece 6 to be ground are recorded in the CL file 12, positional data on the workpiece surfaces in the CL file 12 are transformed into positional data as viewed from the jig coordinate system in which the relative relation with the robot coordinate system is precisely exhibited. This coordinate transformation requires data which express positional relations between coordinate systems constituting the jig coordinate system which are specified by the jig numerals, coordinate systems constituting the jig surface coordinate system which are specified by the jig surface numerals, coordinate systems constituting the workpiece surface coordinate system which are specified by the workpiece surface numerals, and so forth. This will be described later.

The file produced by extracting the positional data for burr removal of the workpieces and the positional data of the tool before and after the burr removal from the CL file 12 in this manner, and by adding the target chamfering angles, the data for coordinate transformation and so forth, will now be referred to as the robot operation information file 14. In the robot operation information file 14, the CL data recorded for each workpiece surface of the workpiece 6 to be machined are stored in the order of the movement path of the tool (in the grinding order).

Since the numerals for specifying the coordinate systems of the jig to be used, the jig surface and the workpiece surface to be machined are added to the CL data recorded for each of the workpiece surfaces, the positional data in the CL data can be transformed into positional data in a reference coordinate system which serves as the origin for controlling the robot. The CL file after this coordinate transformation will now be referred to as a robot command file 17. The actual robot 1 removes burrs by real-time positional correction and control of the path positional data thus produced.

In addition to this real-time positional correction, the controller 2 for controlling the robot must fulfill many other tasks such as sensor control and communication with workpiece transfer mechanisms. Therefore, it is not favorable to apply many loads for processing instruction data to the controller 2. Consequently, when producing the robot command file 17, all the control commands which are sent to the robot 1, such as a tool change command, a movement command, and a burr-removal conducting command, are a command system which is running on the robot controller 2 actually used. It should be noted that productions of the L file 12 to the robot command file 17 are not performed in one program, but that the robot operation information file 14 and the robot command file 17 are produced by performing different programs. This is because there is considered a probability that the program size will be too large to process a large amount of data at once, and because the positional data in the coordinate systems determined for the respective workpiece surfaces, as in the robot operation information file 14, can be modified more easily than the positional data in the reference coordinate system (or the jig coordinate system) in some cases if the data must be modified. Moreover, there is a probability that additional data will be increased in accordance with diversification of kinds and materials of workpieces to be machined in the future. As a result, the program is used for various purposes, and it is necessary to respond flexibly to modification and improvement of the program. When the program is divided in this manner, it is an advantage that the program debug at the time can be performed effectively. However, if data are produced until the robot command file 17 through a single program without dividing the program, substantially the same result can be obtained except for the above-mentioned advantage that it can be used for various purposes.

Next, the algorithm which determines coefficients of cubic functions defining curves which are interpolated between the passing points in Step 5 will be explained.

Figure 7:
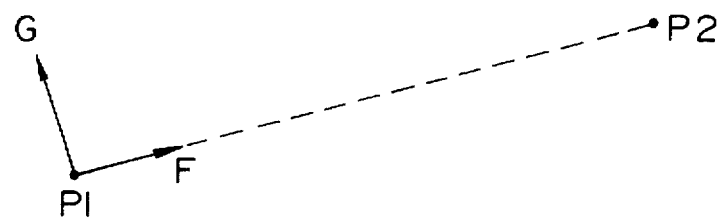
FIG. 7 is a schematic diagram illustrative of a relation between a moving direction of a tool and a directional vector used for controlling the robot according to the invention when the tool is determined to be moved on a straight line.

To change the tool path into sequences of points is to determine positional data which express passing points where the grinding portion of the tool passes. These positional data include not only the position (Px, Py, Pz), as shown in FIG. 7, but also the direction vectors (Fx, Fy, Fz), (Gx, Gy, Gz), (Hx, Hy, Hz) indicating the posture of the tool.

Figure 8:
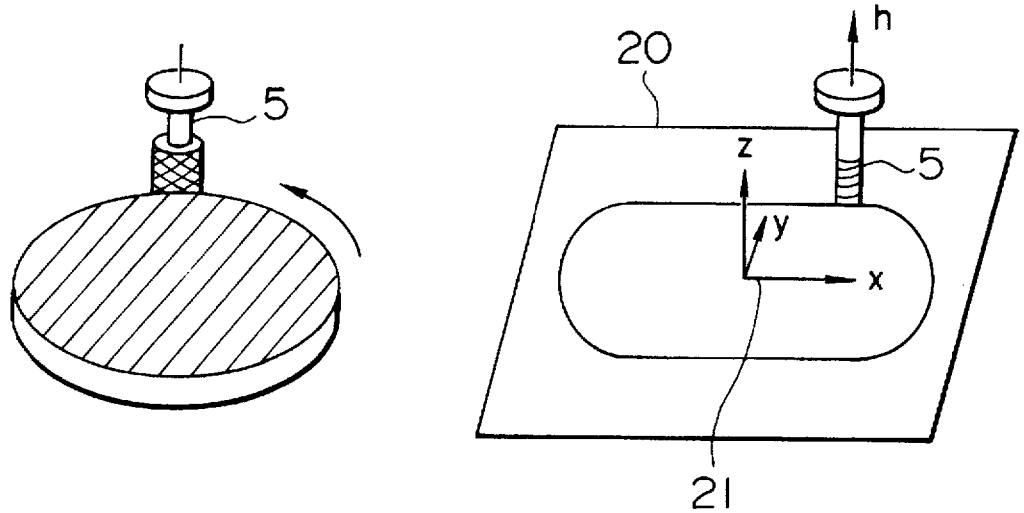
FIG. 8 contains schematic diagrams illustrative of a relation between a position of contact between a tool and an unnecessary portion and a directional vector used for controlling the robot according to the invention when the tool removes the unnecessary portion.
Figure 19:
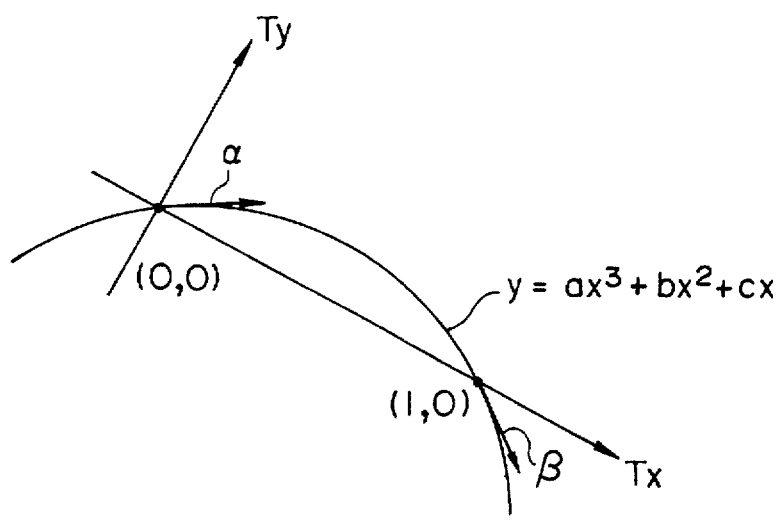
FIG. 19 is a schematic diagram illustrative of interpolation, with a cubic function curve, between two adjacent points on a curved movement path where a tool must pass.
Figure 20:
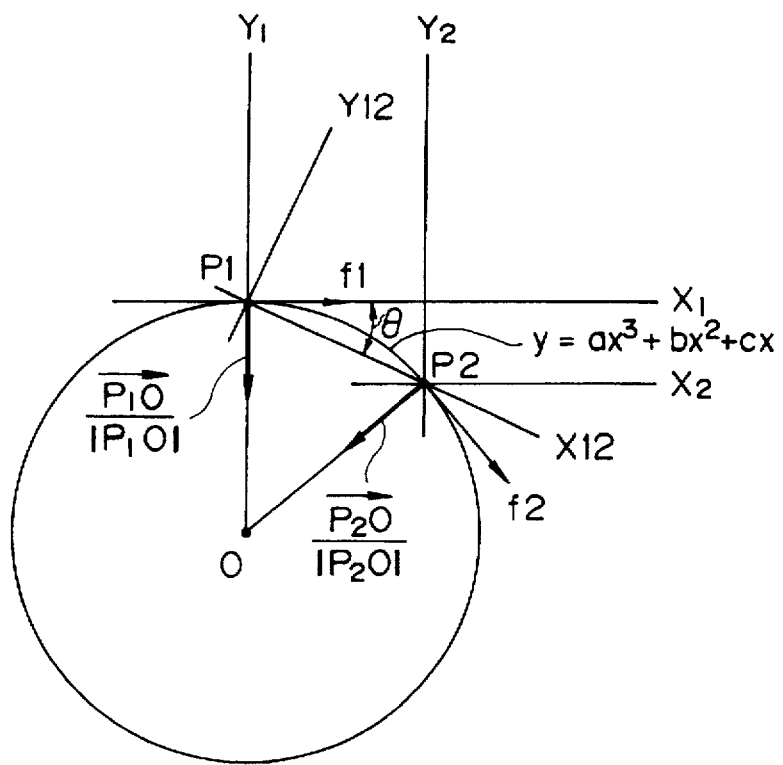
FIG. 20 is a schematic diagram showing that, in order to obtain an appropriate coefficient of a cubic function curve interpolated between two adjacent connecting points on a curved movement path where a tool must pass, tangent lines of two adjacent cubic function curves are identical with each other at each of the connecting points.

When a straight section of the tool path is changed into a sequence of points, a starting point and a terminal point of the straight section are determined first. The starting point is the present position (the position where the tool has now reached) and is already known. Coordinate values immediately after GOLFT(LINE) are positional data (Px, Py, Pz) of the terminal point. In order to position the tool moved by the robot at a desired position and a desired posture, posture information denoted by F, G and H as well as the positional data are required as instruction data given to the robot. As shown in FIG. 7, the direction vector expressing the tool advancing direction (a posture F (Fx, Fy, Fz)) is a unit vector expressing a direction of a tangent line of the tool path at each passing point. That is to say, when the tool path is a straight line, it is a unit vector expressing a direction of a straight line which connects a present position P1 and a target position P2. A posture H is usually a unit vector expressing a direction of a rotational axis of the tool. In the case shown in FIG. 8, a direction Z of a coordinate system 21 in a workpiece diagram 20 is determined as the posture H (Hx, Hy, Hz). A posture G (Gx, Gy, Gz) is obtained from a vector product of H and F. The posture F determined from the present position P1 and the target position P2, the posture H and the posture Z are used to determine directions of a coordinate system used when the tool path is arcuate, as shown in FIGS. 19 and 20.

Figure 9:
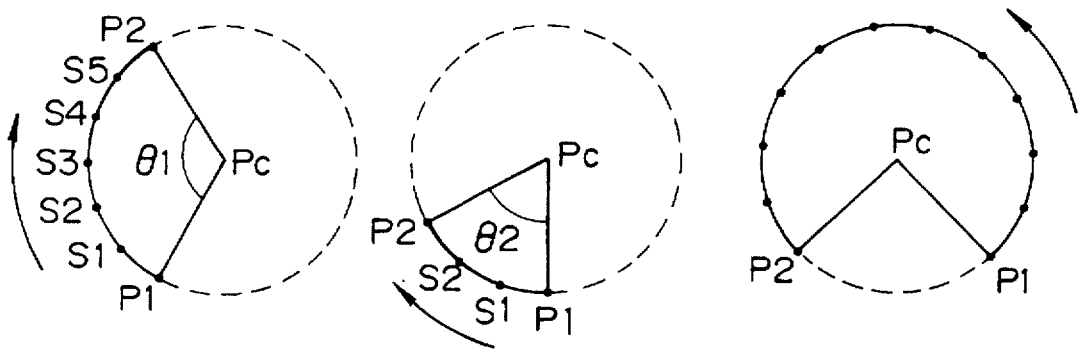
FIG. 9 is a schematic diagram showing that, in this invention, when a tool is moved on a curved movement path, the movement path is divided into sections, and each of the sections contains ends where the tool passes.
Figure 10:
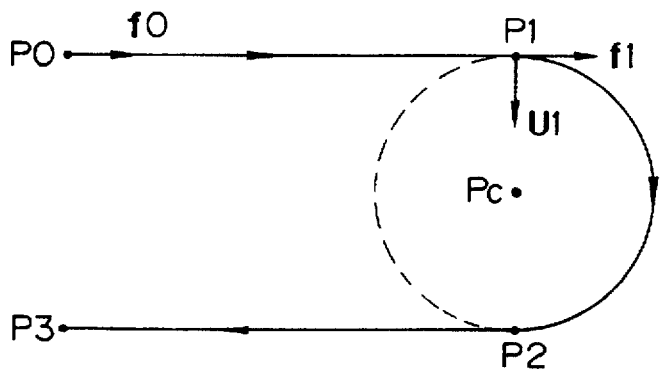
FIG. 10 is a schematic diagram showing a directional vector used for controlling the robot according to the invention when a tool is moved on both of a curved movement path and a straight movement path continuously.

Next, there will be explained the case where an arcuate tool path is changed into a sequence of points. The total number of sequences of points defined on the arcuate tool path may be determined by a center angle of an arc, a radius of the arc, a velocity of the robot and machining accuracy. In this embodiment, however, in order to facilitate the explanation, there will be described the case where passing points on an arc are automatically defined in accordance with a center angle of the arc, as shown in FIG. 9. A sequence of points are defined on an arcuate tool path for moving the tool to a position of an expression (I) shown in FIG. 4 along an arc whose center is a coordinate value of an expression (J) in the following line of GOLFT(ARC) and whose radius is a value of an expression (K) in the subsequent line. In the arc mode, in substantially the same manner as the straight line mode, a posture F is a tangent line at each passing point, and a posture H is determined to be a Z axis direction, i.e., a direction perpendicular to the diagram surface. A tangent line at each passing point on the arcuate tool path is obtained in the following manner. As shown in FIG. 10, it is necessary to align tangent lines of points of connection between the straight lines and the arc, i.e., P1 and P2. First, when a unit vector fO expressing a direction of a tangent line, which is an advancing direction (a posture F) of the tool on the straight tool path, at a point P0 is $$Len0^2 = (P_1x - P_0x)^2 + (P_1y - P_0y)^2$$

the components are $$f_0x=(P_1x-P_0x)/Len0$$

$$f_0y=(P_1y-P_0y)/Len0$$

A unit vector f1 expressing a direction of a tangent line at a passing point P1 on the straight tool path is $$f_1x=f_0x$$

$$f_1y=f_0y$$

Then, at the point P1, a unit vector U1 toward he center point of the arc is $$u_1x=(Pcx-P_1x)/Len1$$

$$u_1y=(Pcy-P_1y)/Len1$$

wherein (Pcx, Pcy) expresses a coordinate of the center point of the arc, satisfying the following equation:

$$Len1^2=(Pcx-P_1x)^2+(Pcy-P_1y)^2$$

Figure 11:
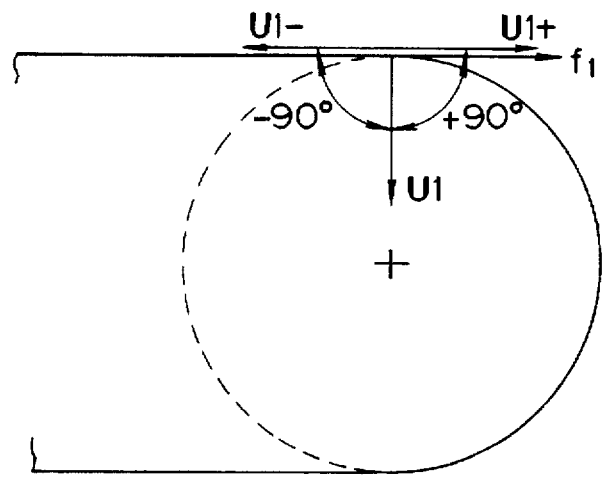
FIG. 11 is a schematic diagram showing a directional vector used for controlling the robot according to the invention when a tool is moved on both of a curved movement path and a straight movement path continuously.

As shown in FIG. 11, by rotating the unit vector U1 for 90° or −90° about the Z axis, unit vectors U1+ and U1-expressing directions of tangent lines of passing points on the arcuate tool path are determined. The vector U1+ which has a smaller value when comparing an angle defined by f1 and U1+ with an angle defined by f1 and U1- is determined as a unit vector expressing a direction of the posture f in a tangent direction of the tool which is moved on the arcuate tool path, at the passing point P1. This is because the posture F of the tool on the straight tool path and the posture f of the tool on the curved tool path are aligned with each other at the connecting point P1. When the direction vector expressing the tool advancing direction (the posture f) at the point P1 is determined in this manner, it is possible to determine an advancing direction of the tool on the arcuate tool path. The number of passing points on the arc is determined by the center angle of the arc, the radius of the arc, the robot operational speed and the finishing accuracy.

For instance, a center angle θ and the number of passing points are as follows:

| Center angle | The number of passing points |
| --- | --- |
| 0° < θ ≦ 90° | 3 |
| 90° < θ ≦ 180° | 6 |
| 180° < θ ≦ 270° | 9 |
| 270° < θ ≦ 360° | 12 |

It should be noted that these passing points are defined by equally dividing the center angle of the arc in this case. Now supposing that the number of passing points is n, the center angle θ will be divided into sections of θ/n°. A position S1 (x, y) of a first division point (n=1) of the n passing points can be calculated from the following expression:

$$x=Pcx+r\sin(\theta/n)$$

$$(x-Pcx)^2+(y-Pcy)^2=r^2$$

(wherein r denotes a radius of the arc)     Expression (1)

Figure 12:
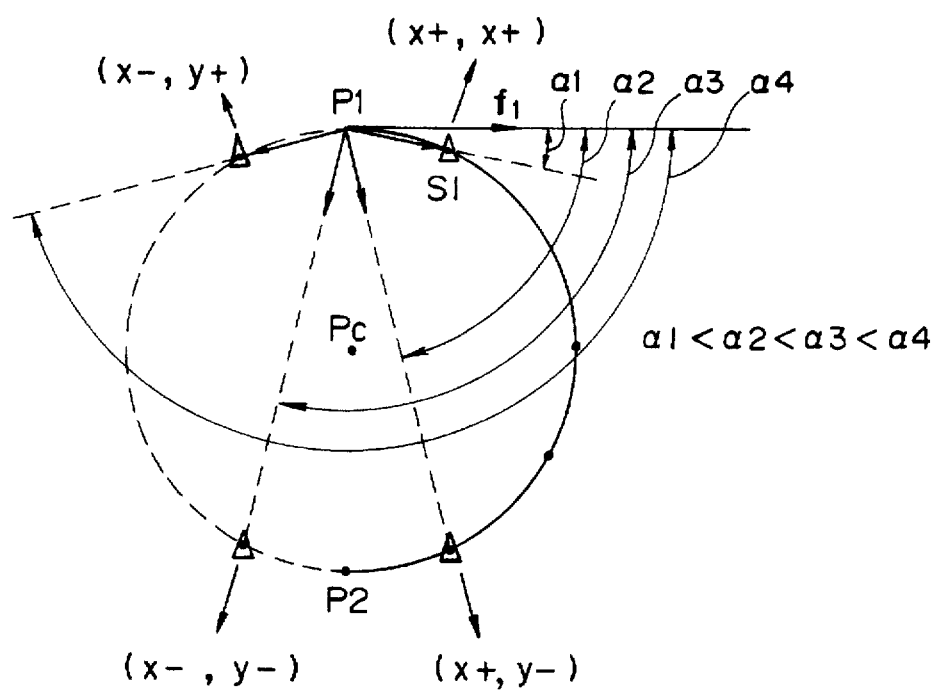
FIG. 12 is a schematic diagram illustrative of specification of a point on a curved movement path where a tool first passes, on the basis of a directional vector expressing an advancing direction of the tool when the tool is located on a straight movement path in the case where the tool is moved from the straight movement path to the curved movement path.

As shown in FIG. 12, however, there are four values of (x, y) (indicated by points Δ) obtained from the expression (1) at the time of n=1. This is because the center of the circle Pc (Pcx, Pcy) is regarded as the origin in the expression (1) so that four positions (x+, y+), (x+, y−), (x−, y+) and (x−, y−) are provided. In order to obtain a position of a division point (a passing point) which the tool first passes in the advancing direction on the arcuate movement path of the tool, as shown in FIG. 12, (x, y), which forms the smallest angle α of angles α1 to α4 defined between the posture vector F at the point P1 obtained before and unit vectors expressing straight lines which connect these four positions (x+, y+), (x+, y−), (x−, y+) and (x−, y−) with the point P1, is a positional coordinate of the passing point. In order to remember a quadrant where the position selected from these four positions is located, the correspondence shown in FIG. 13 is prepared. A start (a point tangent to the straight tool path ) and an end of the arc of the tool path are denoted by Pn and Ps located at the north pole and the south pole, as shown in FIG. 13. When (x, y) which forms the smallest angle α is in the quadrant 0 of the circle, a direction counter value is 0, and when it is in the quadrant 1, a counter value is 1. In this manner, directions counter values are determined until the quadrant 3. As for the division points S2, S3 ... after that, (θ/n)*m (m=2, 3 ...) is substituted for sin of the expression (1), and the four values of (x, y) are calculated similarly. Depending upon a value of (θ/n)*m, selection from the four values of (x, y) is determined. For instance, when (θ/n)*m at the time of m=2 is 90° or less, the direction counter value is the same as the counter value obtained at the first passing point (m=1). However, when it exceeds 90° and is not more than 180°, the direction counter value is not the same as the counter value obtained at the first passing point (m=1).

TABLE 1

| (m = 1,2,3, ...) | |
| --- | --- |
| Amount of m*θ/n (unit °) | Increase with respect to the direction counter value at the starting point of the arc |
| 0 < m*θ/n ≦ 90 | 0 |
| 90 < m*θ/n ≦ 180 | 1 |
| 180 < m*θ/n ≦ 270 | 2 |
| 270 < m*θ/n ≦ 360 | 3 |

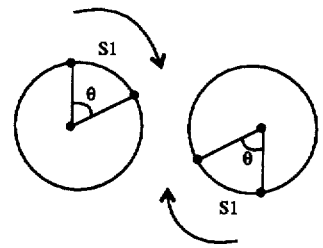

Tool advancing direction: Clockwise

| Amount of m*θ/n (unit °) | Decrease with respect to the direction counter value at the starting point of the arc |
| --- | --- |
| 0 < m*θ/n ≦ 90 | 0 |
| 90 < m*θ/n ≦ 180 | 1 |
| 180 < m*θ/n ≦ 270 | 2 |
| 270 < m*θ/n ≦ 360 | 3 |

TABLE 1-continued

Direction counter value = mod (Direction counter, 4)

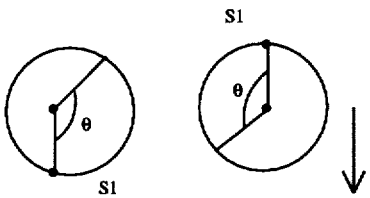

Tool advancing direction:
Counterclockwise

| Direction counter value | (X, Y) sets |
| --- | --- |
| 0 | (X+, Y+) |
| 1 | (X+, Y−) |
| 2 | (X−, Y−) |
| 3 | (X−, Y+) |

When the direction counter value of the first passing point (m=1) is 0 or 2, the tool advances in the clockwise direction so that the counter value will be increased. However, when the direction counter value of the first passing point (m=1) is 1 or 3, the tool advances in the counterclockwise direction so that the counter value will be decreased. If the increased or decreased counter value is 0, a coordinate set of (x+, y+) is selected, and if the counter value is 1, a coordinate set of (x+, y−) is selected. In this manner, concerning the division points S2, S3 . . . , selection from the four (x, y) coordinate sets is determined in accordance with the center angle of the arc (m*θ/n) until the passing points (m=1, 2, 3 . . .).

The direction counter value is increased when the tool advances in the clockwise direction, and decreased when it advances in the counterclockwise direction. Therefore, a value of the direction counter at the arc starting point Y is determined, and a direction counter value at each of the passing points is determined in accordance with the center angle of an arc between the passing point and the arc starting point. Counting of the direction counter is effected in the robot operation determining program, and the direction counter value at each of the passing points determined in accordance with the center angle of an arc between the passing point and the arc starting point is stored in the memory.

Figure 14:
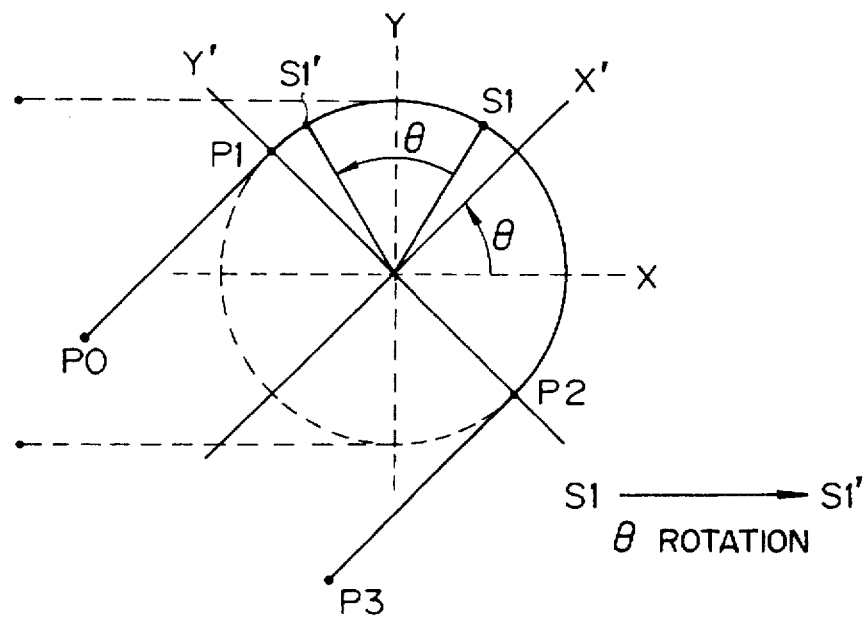
FIG. 14 is a schematic diagram illustrative of rotational correction of a coordinate system having a coordinate axis which contains a boundary point between a straight movement path and a curved movement path when the coordinate system having the coordinate axis which contains the boundary point between the straight movement path and the curved movement path is rotated with respect to a coordinate system of a workpiece in the case where the tool is moved from the straight movement path to the curved movement path.

In this calculation, it should be noted that the starting position of the arc (a tangent point of the straight movement path and the arcuate movement path) is located at the North Pole or the South Pole of the circle (the point on the Y coordinate axis). As shown in an example of FIG. 14, the starting position of the arc (the position of the point P1) is at an arbitrary location. Consequently, (x, y) coordinate values obtained in the X-Y coordinate system must be actually transformed into, for instance, coordinate values in the X'-Y' coordinate system which is a reference coordinate system of the workpiece, as shown in FIG. 14. For this purpose, an angle (θ°) for which the X'-Y' coordinate system is rotated about the Z axis with respect to the X-Y coordinate system is calculated from the following expression, and the (x, y) value in the X-Y coordinate system is rotated in accordance with this calculation result. For instance, when directional cosine vectors of coordinate axes in the X-Y-Z coordinate system are denoted by l, m and n, and when directional cosine vectors of coordinate axes in the X'-Y'-Z' coordinate system are denoted by l', m' and n', Δθ can be obtained from the following expression:

$$2\cos\Delta\theta = (1 \cdot 1' + m \cdot m' + n \cdot n' - 1)$$

Figure 15:
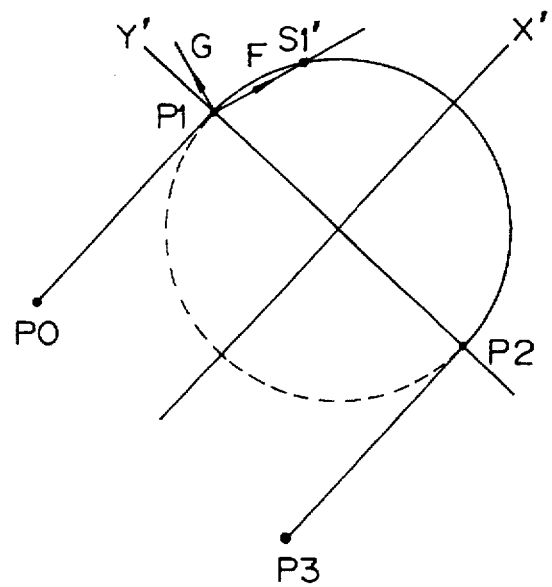
FIG. 15 is a schematic diagram illustrative of a relation between a directional vector expressing a posture of a tool and a point on a curved movement path where the tool must pass, which relation is required for controlling a robot.

Moreover, as shown in FIG. 15, a direction of a coordinate axis for calculating a cubic function curve which is interpolated between adjacent passing points on the arc can be obtained from a unit vector F (Fx, Fy, Fz) expressing a direction of a straight line which connects the passing point P1 with the passing point S1', and a unit vector G (Gx, Gy, Gz) which is a vector product of H and F when a unit vector H (Hx, Hy, Hz) is determined constantly to be a unit vector (0, 0, 1) perpendicular to the workpiece surface (i.e., the diagram surface).

Figure 16A:
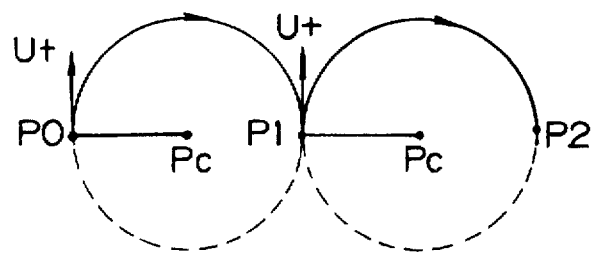
FIGS. 16(A) and 16(B) are schematic diagrams illustrative of specification of a moving direction of a tool in the case where the tool is moved to a curved movement path without passing a straight movement path.
Figure 16B:
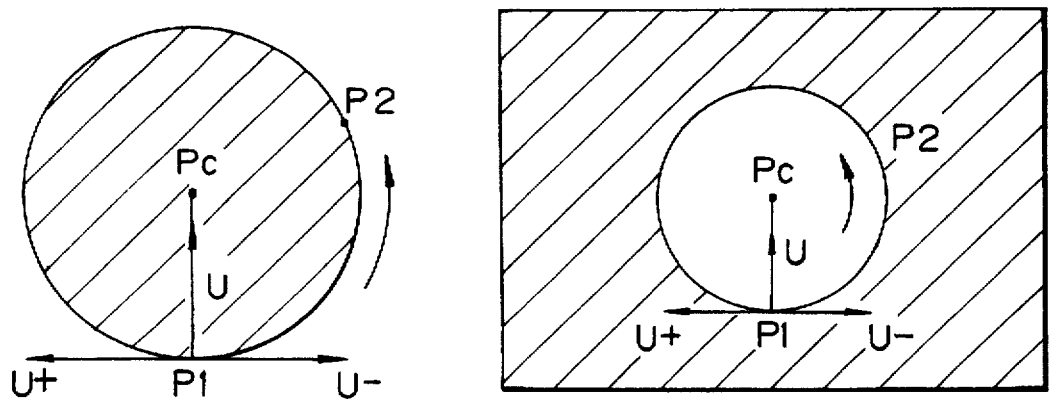
Figure 17:
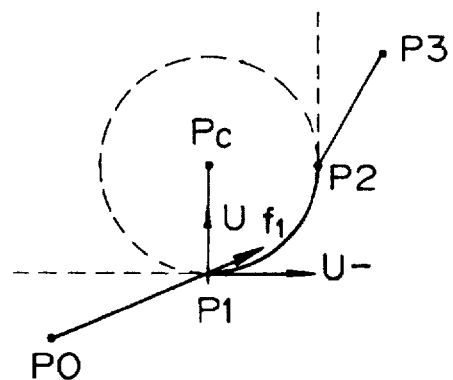
FIG. 17 is a schematic diagram illustrative of the case where a directional vector expressing a moving direction of a tool on a straight movement path is different from a directional vector expressing a moving direction of the tool at a starting point of a curved movement path, and the case where a directional vector expressing a moving direction of the tool on a curved movement path is different from a directional vector expressing a moving direction of the tool at a starting point of a straight movement path.

Although a method of producing a sequence of points on an arc from the item GOLFT(ARC) has been described in the case where the tool is moved from the straight line mode to the arc mode, as shown in FIG. 10, there will now be described the case where the arc mode does not begin with a straight line. It is equivalent to the case of a ridgeline configuration which is a series of arcs, as shown in FIG. 16(A), and to the case where burrs must be removed not from the ridgeline of the workpiece but from holes in the inner surface or the outer surface of the workpiece, as shown in FIG. 16(B). In this case, a sequence of points are produced with basically the same concept. However, it is different from the former case in that the line tangent to the straight line mode can not be compared at the arc starting point P1 so that it is necessary to determine the advancing direction of the tool in a different method. For instance, the direction of the arc is counterclockwise if it is not particularly specified, and in the case shown in FIG. 16(B), the tool starts at the point P1 and is moved toward the point P2. In this case, a vector U− obtained by rotating the unit vector connecting the center of the circle with the point P1 for −90 degrees is a tangent line at the point P1, and the rest can be performed in the same algorithm as production of the arc passing points (change into a sequence of points) from the straight line mode. Further, FIG. 17 shows an example in which a straight line and an arc are continuous but their tangent lines do not align with each other at a point P1 of connection between the straight line and the arc. In this case, instead of regarding the straight line and the arc as continuous, they are divided into three sections and thought of as a straight line, an arc and a straight line.

Next, a coefficient of a cubic function defining a curve which is interpolated between adjacent passing points is determined.

In general, a cubic function is defined by $y = ax^3 + bx^2 + cx + d$. In the case of a straight line, however, as shown in FIG. 19, $y = ax^3 + bx^2 + cx$ may be used for a cubic curve connecting two points (0, 0) and (1, 0) in the Tx–Ty coordinate system. In this case, in the straight line connecting the two points, the relation $a = b = c = 0$ is established in the Tx–Ty coordinate system because $y = 0$.

Moreover, there will be explained a method for determining a coefficient at the time of interpolation between adjacent passing points on the arcuate tool path.

As shown in FIG. 19, the cubic curve $y = ax^3 + bx^2 + cx$ is presumed to pass the origin (0, 0) and (1, 0) in the Tx–Ty coordinate system. Also, a unit vector expressing a direction of a tangent line of the curve at the origin (0, 0) is denoted by α, and a unit vector expressing a direction of a tangent line of the curve at (1, 0) is denoted by β. By substituting $x = 1$ and $y = 0$ for the cubic curve $y = ax^3 + bx^2 + cx$, there can be obtained the following expression:

$$a + b + c = 0$$

Further, when $x = 0$ is substituted for $\alpha = 3ax^3 + 2bx + c$.

c=α

Also, when x=1 is substituted for β=3ax³+2bx+c,

β=3a+2b+c

Thus, a=α+β b=−β−2α c=α

Referring now to FIG. 20, there will be considered the case where a cubic curve is interpolated between a passing point P1 and a passing point P2. Unit vectors expressing directions of tangent lines at the point P1 and the point P2 are denoted by f1 and f2 in the X–Y coordinate system. The unit vectors f1 and f2 can be obtained by rotating a unit vector $$\frac{\overrightarrow{P1-O}}{|P1-O|}$$

expressing a direction of a straight line which connects O and P1 and a unit vector $$\frac{\overrightarrow{P2-O}}{|P2-O|}$$

expressing a direction of a straight line which connects 0 and P2 for +90° or −90° in substantially the same manner as +90° or −90° rotation of U1+ and U1−, as shown in FIG. 11. These two tangent direction vectors are next transformed into tangential vectors in the X12–Y12 coordinate system. In other words, when an angle defined between the X12 axis of the X12–Y12 coordinate system connecting the point P1 and the point P2, and the X axis of the X–Y coordinate system is denoted by θ, tangential vectors of f1 and f2 as viewed from the X12–Y12 coordinate system are as follows:

f1'=Rf1 f2'=Rf2 wherein $$R = \begin{pmatrix} \cos\theta & -\sin\theta \\ \sin\theta & \cos\theta \end{pmatrix}$$ (Expression 1)

In consequence, when f1'=(f1'x, f1'y) and f2'=(f2'x, f2'y),

α=f1'y/f1'x

β=f2'y/f2'x

The cubic curve coefficient can be determined from a=α+β b=−β−2α c=α

Moreover, the matrix of rotation around the Z axis is expressed as follows:

$$R = \begin{pmatrix} \cos\theta & -\sin\theta & 0 \\ \sin\theta & \cos\theta & 0 \\ 0 & 0 & 1 \end{pmatrix}$$ (Expression 2)

Figure 18:
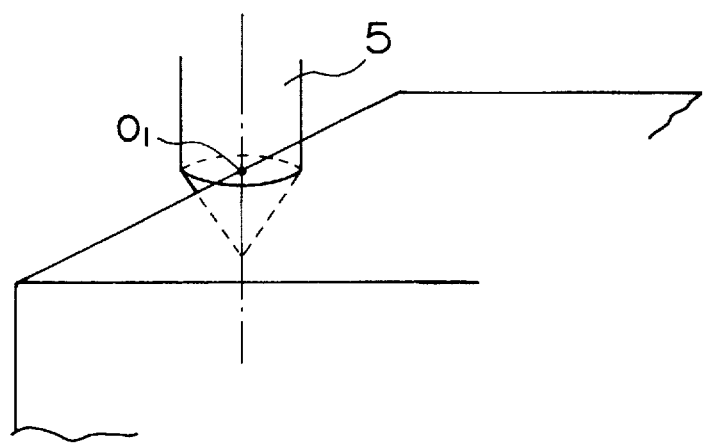
FIG. 18 is a schematic diagram showing a boundary on a workpiece between an unnecessary portion to be removed and the rest of the workpiece (i.e., a virtual movement path of a tool or a desired designed shape of the workpiece)
Figure 23:
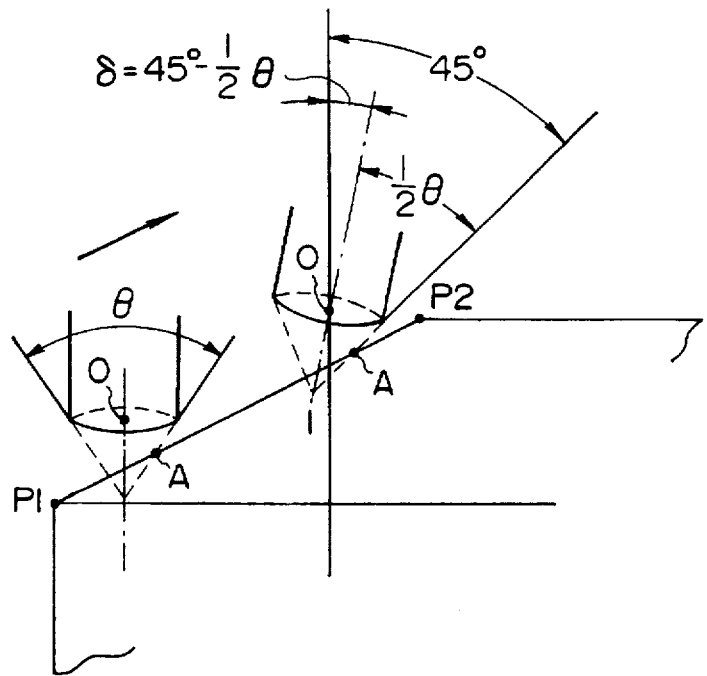
FIG. 23 is a schematic diagram illustrative of a relation between a boundary on a workpiece between an unnecessary portion to be removed and the rest of the workpiece (i.e., a desired designed shape of the workpiece), and an actual movement path and an actual posture of a tool.

Correction of the tool path (Step 7) will now be described. The tool path (the path of the grinding portion of the tool) in the robot operation information file 14 shown in FIG. 3 can be regarded as a movement path along a boundary between the unnecessary portion to be removed and the rest of the workpiece 6 at the virtual center point 0 of the burr removing tool 5, as shown in FIG. 18. In order to conduct burr removal operation actually, the movement path of the reference coordinate system of the tool (The robot controls the position and the posture of this reference coordinate system.) must be calculated while conducting modification in accordance with the tool shape and the target chamfering angle. FIG. 21 illustrates tools with grinding wheels having diameters d, lengths L and angles θ which are different from one another. A Point T which is a middle position of each grinding wheel is supposed to be contacted with the workpiece. When burrs are to be removed from a portion between P1 and P2 shown in FIG. 22, the tool is first shifted for +L/2 in the Z direction and −d/4 in the X direction. Further, when the target chamfering angle is, for instance, 45°, as shown in FIG. 23, the Z axis must be inclined for δ=45°−θ/2 toward the workpiece. This is the case where the shape of the grinding wheel is conical. However, as shown in FIG. 21(B), when it is cylindrical, the tool is shifted for −d/2 in the X direction. If a certain portion of the tool 5 is used for a long time, the tool 5 will start to be worn. Since this results in deterioration of finishing accuracy in burr removal, it is necessary to displace the portion to be contacted with the workpiece, from the point T (offset displacement) so that the tool 5 will not be terribly worn. In order to define the robot path actually, the robot operational language output program receives, from the robot operation information, the tool numeral, the target chamfering angle, the tool offset amount, the location of the workpiece whether it is located on the left or right of the tool with respect to the tool moving direction, and so forth, and the tool information file 18 in which the actual shape and size of the tool for use are stored is referred to, so that correction corresponding to the tool is performed instantaneously. Thus, there is calculated the robot path for properly positioning the reference coordinate system of the tool.

Positional correction of the tool will be described more specifically.

Figure 24:
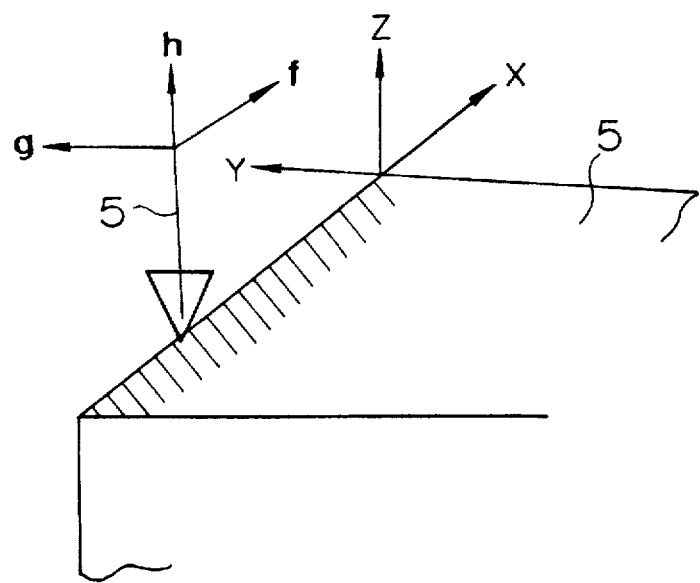
FIG. 24 is a schematic diagram illustrative of a relation between a directional vector expressing a posture of a tool and an actual posture of the tool, which relation is required for controlling a robot.

Since the tool movement path which is recorded in the CL file produced on the basis of the CAD diagram information and the robot operation information file 14 is usually data expressing positions of edge portions (edges, ridgelines) of the workpiece, it is necessary to shift the path positional data in accordance with a diameter d and a grinding wheel angle θ of the tool for use. This method has a prerequisite that a posture h of the tool is in substantially the same direction as the Z axis and an advancing direction f of the tool is in substantially the same direction as the X axis, as shown in FIG. 24. When the grinding portion of the tool is located on the right with respect to the tool advancing direction f, as shown in FIG. 24, and the tool is rotated for δ in the clockwise direction around the f axis, the following expressions are established:

g'=cos δg+(1−cos δ)(f·g)f h'=cos δh+(1−cos δ)(f·h)f

Next, when the diameter at that portion of the tool where the tool and the workpiece are actually contacted is denoted by d' (as described above), the tool position is $$p = p + sig * \frac{d}{2} * g$$

wherein p expresses a correction amount, and sig expresses a constant which is 1 when the grinding portion is located on the right with respect to the tool advancing direction and which is −1 when it is located on the left.

When the above-mentioned offset amount is added to this, $$p = p + sig * \frac{d}{2} * g + Of$$

wherein of denotes the offset amount.

Next, coordinate transformation (Step 8) will be explained.

Figure 25:
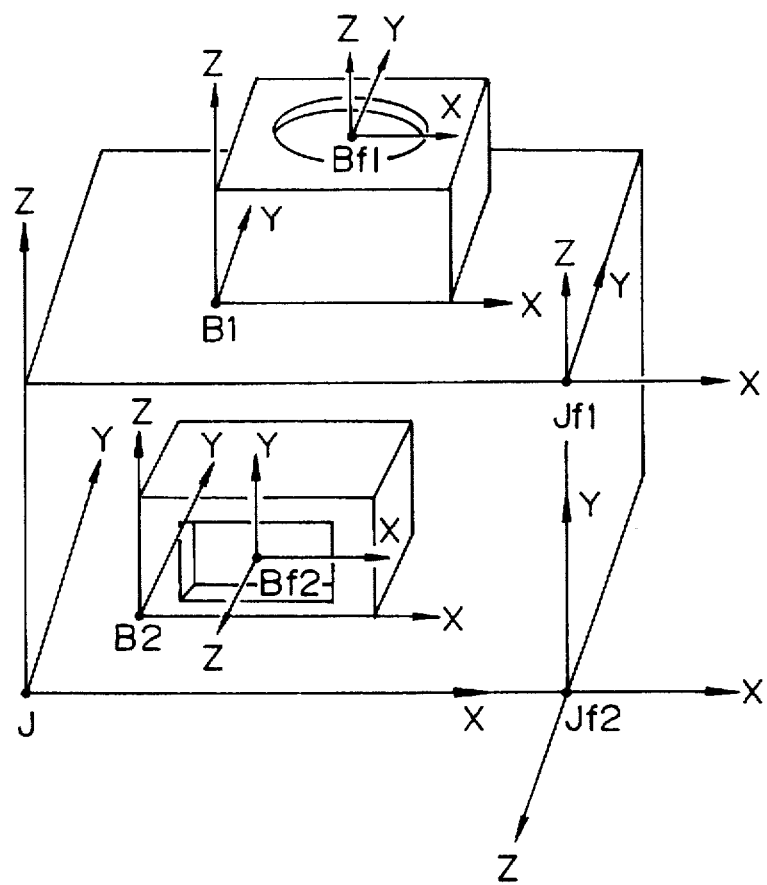
FIG. 25 is a schematic diagram illustrative of relations between a coordinate system of a surface of a workpiece including an unnecessary portion to be removed, a coordinate system of the whole workpiece, a coordinate system of a surface of a jig on which the workpiece is securely fixed, and a coordinate system of the whole jig.

So far, there has been described the method of using the CAD diagram and defining the operation path of the reference coordinate system of the tool from the data in the CL file 12 by the robot 1. The CL data include definitions of the coordinate systems for the respective surfaces of the workpiece diagram, as described above, and the positional data are values in the respective coordinate systems. In order to control the robot 1, it is necessary to transform the positional data in the respective coordinate systems into coordinate values as viewed from a common reference coordinate system. When machining the workpieces 6, each of the workpieces is always attached to the predetermined jig 7. Therefore, as the common reference coordinate system, a coordinate system of each jig (the jig coordinate system) is employed. The positional data produced in the robot operation determining file 14 shown in FIG. 3 are transformed into positional data in the jig coordinate system. After that, the positional data in the jig coordinate system are transformed into positional data in a robot coordinate system and stored in the robot command file 17. The coordinate transformation from the workpiece surface coordinate system to the robot coordinate system is performed in the following flow:

Workpiece surface coordinate system ⇒ Workpiece coordinate system ⇒ Jig surface coordinate system ⇒ Jig coordinate system ⇒ Robot coordinate system FIG. 25 illustrates one example of a condition in which workpieces are securely fixed on a jig.

Figure 26:
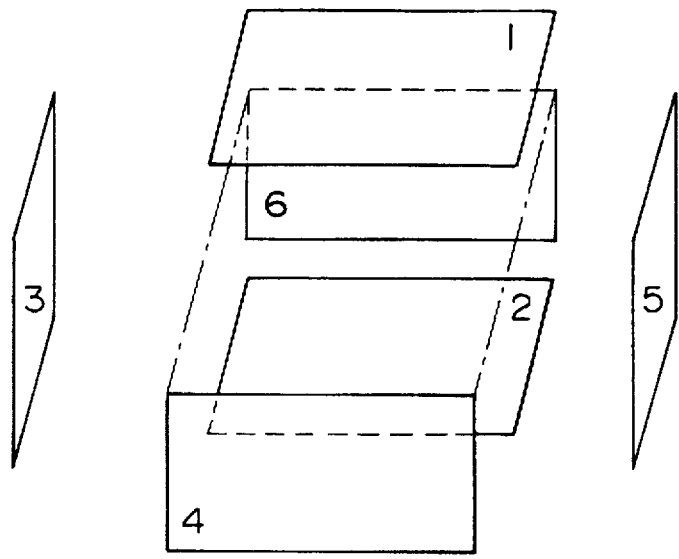
FIG. 26 is a schematic diagram illustrative of one example of numbering for specifying a position of the jig surface with respect to the whole jig and a position of the surface including the unnecessary portion with respect to the whole workpiece.
Figure 27:
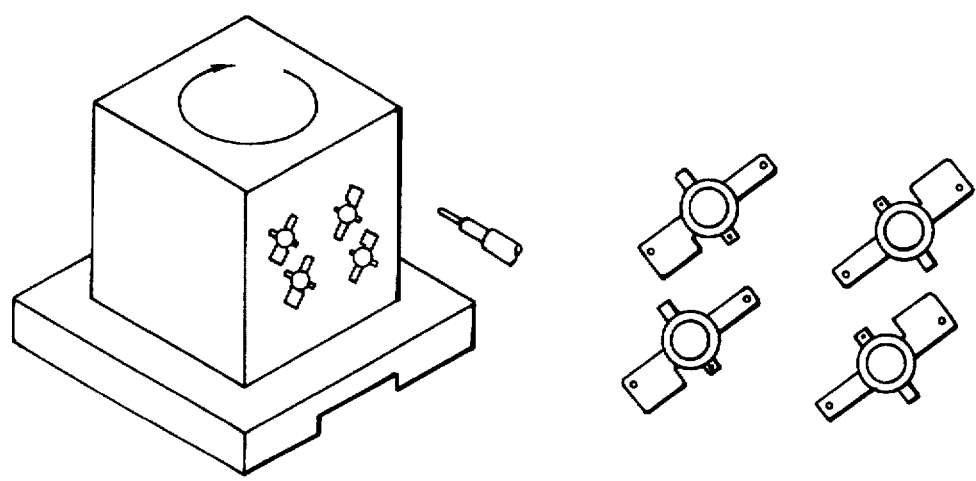
FIG. 27 contains schematic diagrams illustrative of a relation between the jig surface coordinate system and the whole workpiece coordinate system when a plurality of workpieces are securely fixed on the jig surface.

Each workpiece is attached on a 'surface' of the jig, and burrs on a 'surface' of the workpiece are ground. Therefore, the jig surface coordinate system corresponding to the jig coordinate system is required, and the workpiece coordinate system as viewed from each jig surface is required to know a region on the jig surface where the workpiece is located. In the tool path defining program, the jig numeral, the jig surface numeral and the workpiece surface numeral for specifying the coordinate system to be used among the coordinate systems constituting the jig and workpiece coordinate systems are added to the CL data produced for each workpiece surface, and the above-described coordinate transformation is effected on the basis of these numerals. Jig surfaces and workpiece surfaces are denoted by jig surface numerals and workpiece surface numerals, for example, as shown in FIG. 26. Further, in FIG. 27, four identical workpieces are attached on a certain jig surface. Even if the attaching directions are rotated for 180° in this example, CL data for one workpiece are produced by checking the number of workpieces on the jig surface (four in this case) and defining four workpiece coordinate systems in the CL file 10 when these four identical workpieces all have the same grinding portion and the same grinding order.

Hereinafter, correction of a tool path on the basis of a measured actual workpiece configuration will be described with reference to FIGS. 28 to 35.

A search command and an operation command used for correction of the tool path on the basis of the actual workpiece configuration will now be described. The search command includes a designated search point which is a coordinate value for specifying the position of a point on the workpiece whose actual shape will be measured, and a designated search direction expressing an advancing direction of a shape measuring sensor for measuring the actual shape at the designated search point. The search command is designed to be incorporated in a robot control sequence when it makes a pair with the operation command for specifying a search point where the actual shape is measured, this actual shape being used for a correcting method and the correction of the movement path of the tool on the basis of the measured actual shape in a burr removal operation sequence of the robot. For each of operational portions (burr removal positions) specified by a command for the robot control, a search point and a search direction are specified to obtain the real position of the operational portion. On the other hand, a correcting method and a search point to be used are specified in the operation command so that a drive command value is corrected on the basis of the real positions (the shape) of the designated search points actually searched. More specifically, the following correcting methods of various kinds are specified.

Correcting method 1: Only one search point is used, and the movement path of the tool is shifted to an extent corresponding to a deviation between the position of the workpiece which is actually measured at the search point and a designed value of the position of the workpiece at the search point.

Correcting method 2: A line segment connecting positions of the workpiece which are actually measured at two search points and a line segment connecting designed values of positions of the workpiece at the search points are obtained, and the movement path of the tool on the basis of a designed value of a passing point is shifted to an extent corresponding to a deviation between a projection point of the designed value of the passing point on the line segment to be corrected (the movement path of the tool) with respect to the line segment between the designed values, and a projection point of the designed value of the passing point with respect to the line segment between the search points.

Correcting method 3: A plane with search points including positions of the workpiece which are actually measured at the three search points and a plane with designed values including the designed values of positions of the workpiece at the search points are obtained, and the movement path of the tool on the basis of a designed value of a passing point is shifted to an extent corresponding to a deviation between a projection point of the designed value of the passing point on the plane to be corrected (the movement path of the tool) with respect to the plane with the designed values, and a protection point of the designed value of the passing point with respect to the plane with the search points.

Correcting method 4: According to the correcting methods 1 to 3, when coordinate components to be corrected are restricted, only the restricted coordinate components are corrected.

Consequently, after suitably specifying points to be searched and correcting methods for each of the operational portions, the search command including these points and the operation command which specifies the correcting methods and search points to be used are incorporated into the operation sequence of the robot, so that not only an operation with respect to each of the operational portions of an operation object but also an operation with respect to a different object of the same kind can be performed by the robot quite favorably.

For concrete explanation of the present invention, a robot system to which the invention is applied (a burr removing robot system in this embodiment) will be described first. FIG. 1 illustrates a system structure of the one embodiment. With this structure, in a host processor 3, designed size data values are preliminarily produced in relation to operation objects of various kinds and stored as a data file, from which designed size data values of each of desired operational portions are extracted. A robot operational course, a command for burr removal and a search command (including designated search points, designated search directions and designated correcting methods) are produced on the basis of these designed size data values. The command for burr removal is interpreted by an interpreter in a robot drive/control means 2, and then, a robot 1 is controlled to operate in a predetermined manner by the robot operational course, the command for burr removal and the search command. A burr removing tool 5 and a power sensor (not shown) are attached on a hand of the robot 1. Burrs existing on a ridgeline of each operational portion of an operation object (not shown) which is substantially positioned are ground and removed by the burr removing tool 5. In order to define a robot operational course in the host processor 3, when the ridgeline from which burrs are to be removed is a curve, the ridgeline is smoothly approximated to a cubic expression, and a coefficient of the cubic curve as well as a drive command position and a posture condition is registered as the burr-removal command. Also, the search command is registered in the robot operation sequence when it makes a pair with the burr-removal command. The designated search directions contained in the search command are, concretely, directions perpendicular to the plane on which the search points exist.

For removing burrs from the ridgeline which is an object for burr removal, search operations are first conducted successively for the respective designated search points (the number of the search points is one or more and three or less per correcting method) by executing the search command, and then, burr-removal operation with respect to the ridgeline is performed. The search command and the burr-removal command with respect to the ridgeline are supplied from the work station 3 to the robot drive/control means 2, for example, in the following format (the number of designated search points is two in this embodiment):
SEARCH
Search numeral 1
   Designed value of designated search point $\underline{x}_1$
   Designated search direction $\underline{d}_1$
SEARCH ps Search numeral 2
   Designed value of designated search point $\underline{x}_2$
   Designated search direction $\underline{d}_2$
CUT
   Designated correcting method 2
   Employed search numeral 1, 2

Sequence of command passing points $\underline{x}_2, \underline{x}_2, \ldots, \underline{x}_n$
'SEARCH' expresses a search command, and 'CUT' expresses a burr-removal command. '2' of the designated correcting method is a correcting expression numeral which specifies a type of combination of one of the above-described correcting methods 1 to 3 with the correcting method 4. In this embodiment, the 'correcting method 2' is specified as the correcting expression numeral. The real position of the ridgeline which is the burr-removal object is calculated by executing the search command twice, and the sequence of command passing points $\underline{x}_1, \underline{x}_2, \ldots, \underline{x}_n$ is corrected on the basis of the real position thus calculated. Correction at the time is performed by the specified correcting method. The number of search commands, i.e., the number of designated search points is one when a designated search object is a point, two when it is a straight line, and three when it is a plane. It should be noted that underlined variables denote vectors, and that such denotement is employed in the same manner in expressions and drawings of various kinds illustrated below.

Figure 29:
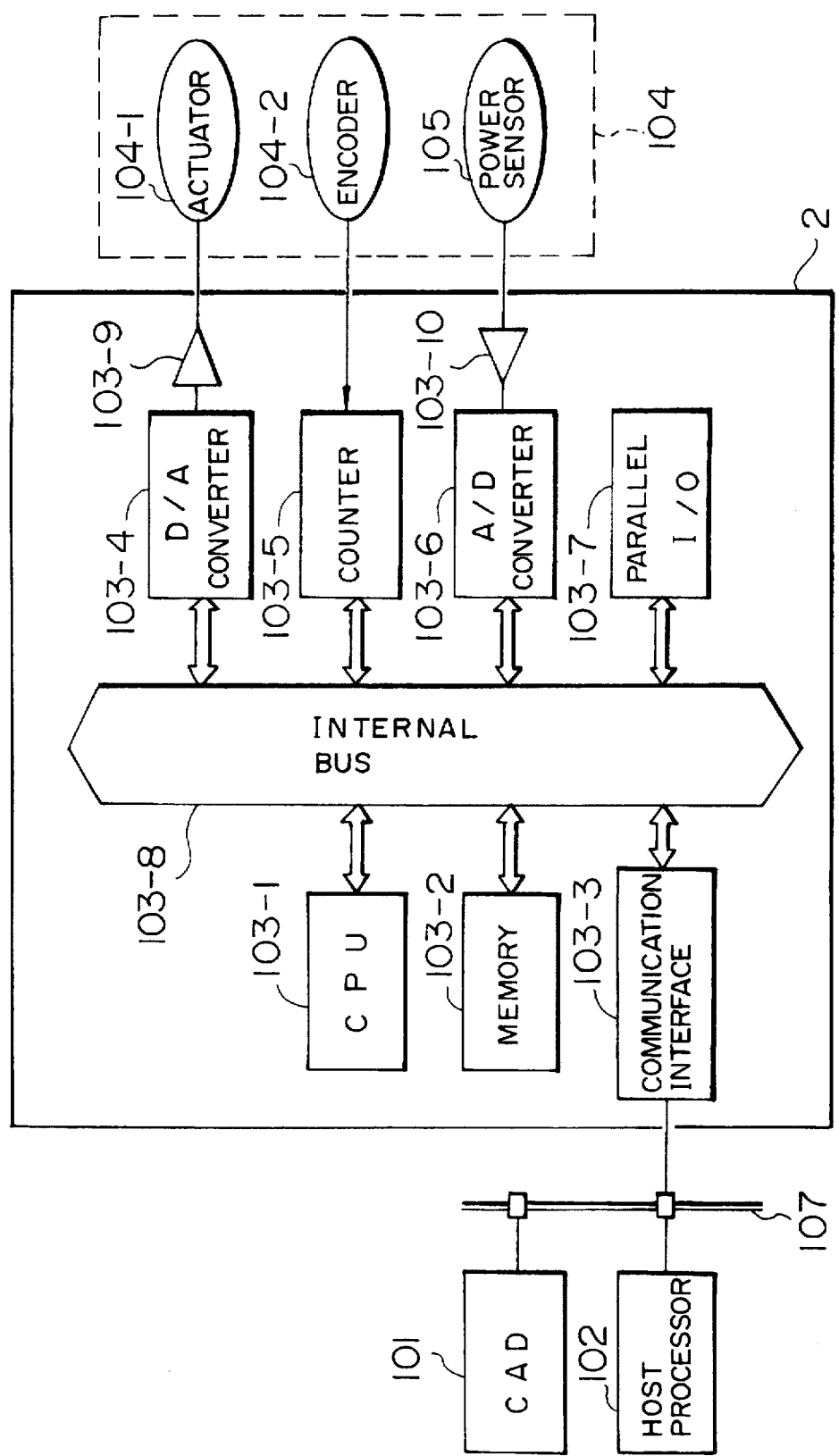
FIG. 29 is a block diagram showing a schematic chart of a robot for measuring an actual shape of a workpiece.

One portion of an internal structure of the robot drive/control means 2 in the robot system shown in FIG. 1 will now be described with reference to FIG. 29. As shown in the illustration, a CAD means 101 and a host processor 102 in the work station 3 are connected to the robot drive/control means 2 through a network bus 107 so that data of various kinds can be transferred between these means 101, 102 and 2, if necessary. In the internal structure of the robot drive/control means 2, as shown in the illustration, a central processing unit 103-1, a memory (an RAM for workpieces and an ROM for storing programs) 103-2, an interface unit for communication 103-3, a digital/analog converter (corresponding to an actuator) 103-4, a counter board (for counting signals from a plurality of encoders 104-2) 103-5, an analog/digital converter (for digital conversion of signals from a power sensor 104-1) 103-6, and a parallel I/O board (for data input/output with an input/output means in the vicinity) 103-7 are connected to one another through an inner bus 103-8. When the actuator 104-1 is driven through a servo amplifier 103-9 by analog output from the digital/analog converter 103-4, the robot 1 is operated in a desired manner, and its position/posture conditions can be known from count values at the counter board 103-5. An amplifier 103-10 serves to amplify a sensor signal from the power sensor attached in the vicinity of a hand of the robot 1 so that when a search command is executed, it will be detected from the sensor signal that the hand of the robot 1 is contacted with a designated search point on the operation object.

Figure 28:
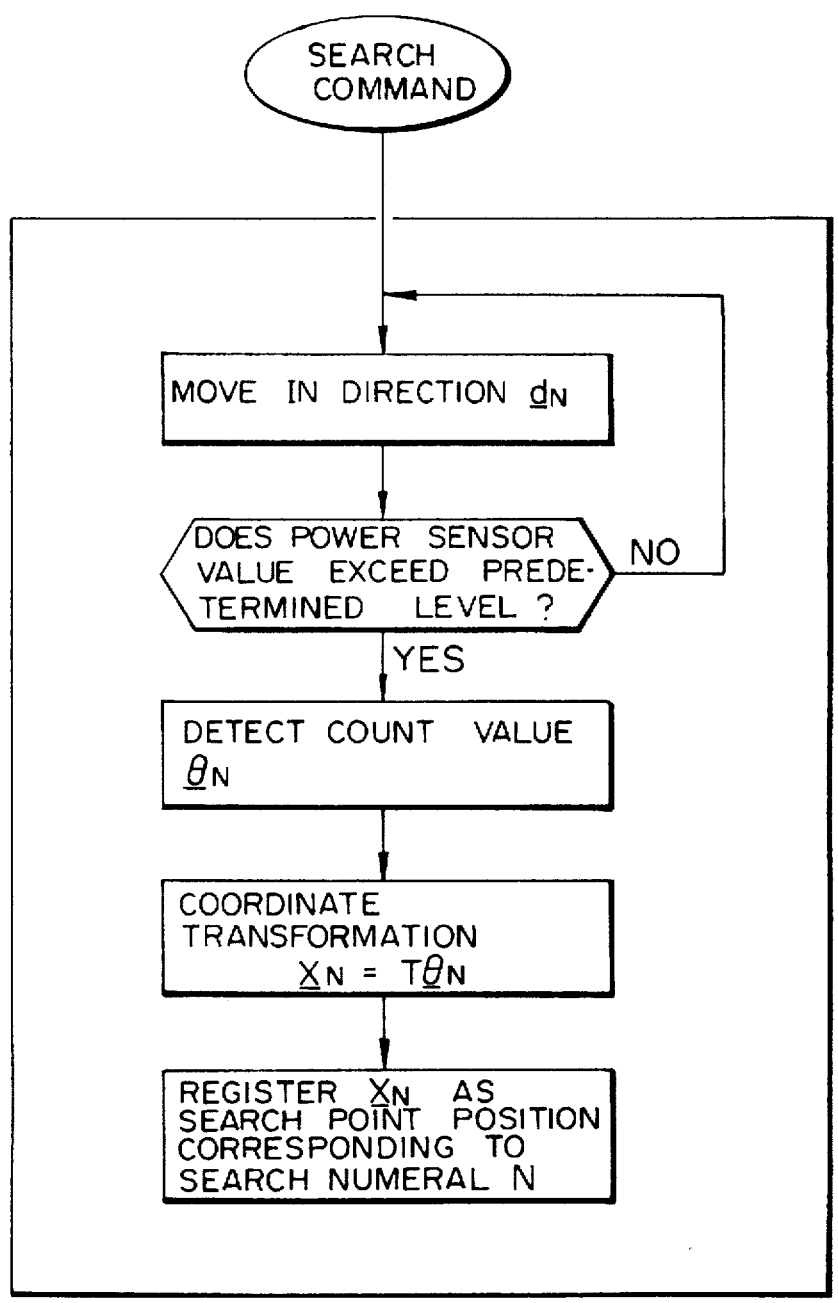
FIG. 28 is a schematic flow chart illustrative of operation of a robot when the robot measures an actual shape of a workpiece.

Execution of a search command according to this invention will be described with reference to FIG. 28 showing a flow of the executing operation. The search command is designed to be executed not less than once and not more than three times in each of the correcting methods. As shown in the illustration, for executing a search command corresponding to a search numeral N, the robot drive/control means 2 first functions in such a manner that the robot 1 is driven in a designated search direction $\underline{d}_N$ specified by the search command until the hand of the robot 1 is contacted with an operation object. It is judged by a sensor signal from the power sensor 104-3 whether or not the hand is contacted then. When a signal level of the sensor signal reaches a certain value, contact with the designated search point on the operation object is detected. Therefore, from each of a plurality of count values $\underline{\theta}_N$ from the counter board 103-5 at the time of contact, a real position $\underline{x}_N$ of the designated search point can be calculated as $T\underline{\theta}_N$ (T: a coordinate transformation matrix) by coordinate transformation. The real position $\underline{x}_N$ is temporarily stored in the memory 103-2 corresponding to each of the search numerals N. Since the real position $\underline{x}_N$ is obtained corresponding to each of the search numerals N in this manner, it is possible to calculate the real position of the ridgeline which is the burr-removal object. On the basis of this result, the sequence of command passing points $\underline{x}_1, \underline{x}_2, \ldots, \underline{x}_n$ are transformed into a sequence of command passing points $y_1, y_2, \ldots, y_n$ in accordance with the real position of the ridgeline by a correcting method corresponding to the specified correcting expression numeral.

Figure 30:
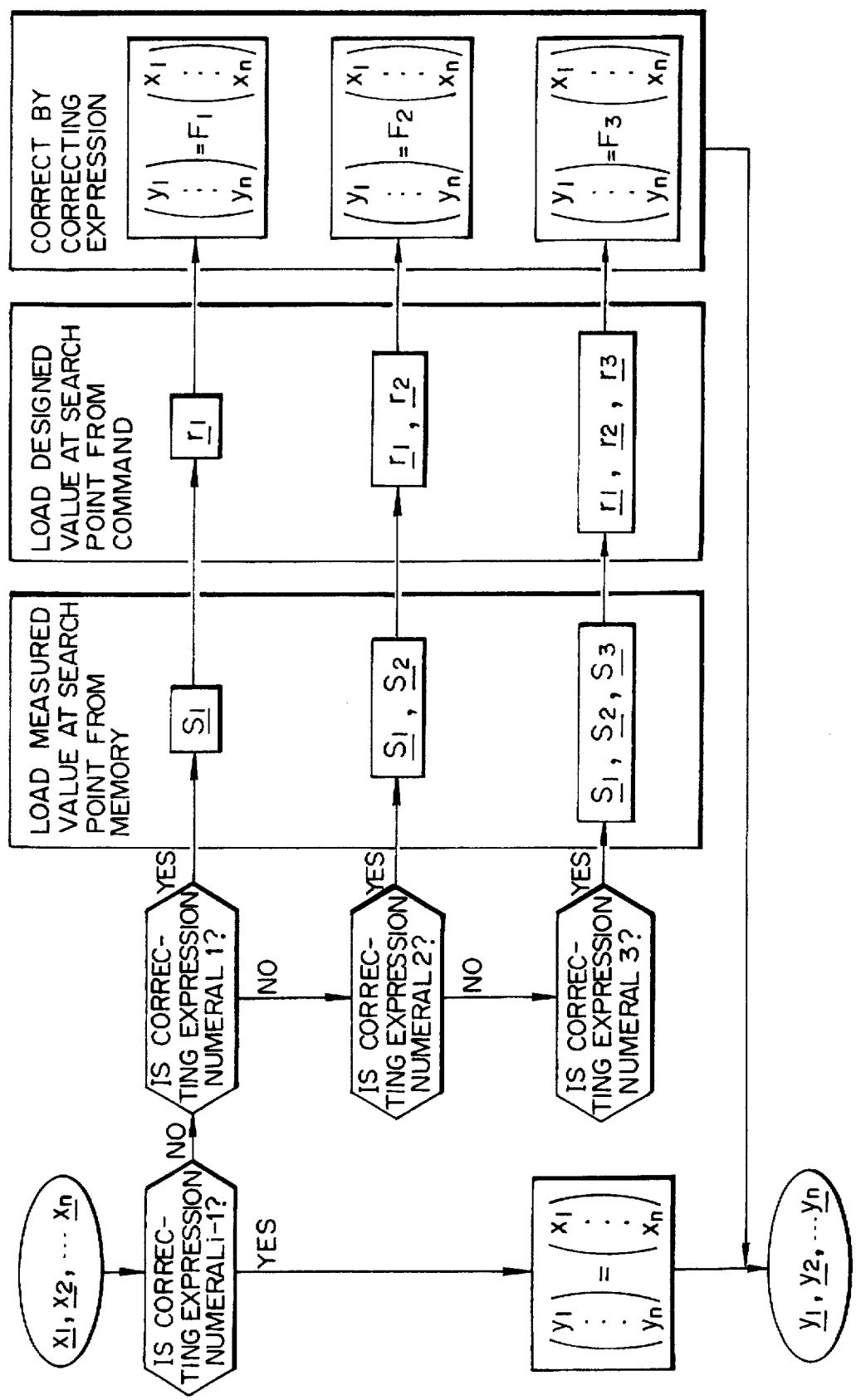
FIG. 30 is a block diagram illustrative of calculation of a movement path of a tool (i.e., a course along an actual boundary on a workpiece between an unnecessary portion to be removed and the rest of the workpiece) on the basis of a measured actual shape of the workpiece and a position of the unnecessary portion which is specified on a desired shape of the workpiece (i.e., a course along a specified boundary on the workpiece between the unnecessary portion to be removed and the rest of the workpiece)

FIG. 30 shows a flow of transformation processing from the sequence of command passing points $\underline{x}_1, \underline{x}_2, \ldots, \underline{x}_n$ into the sequence of command passing points $y_1, y_2, \ldots, y_n$. As described before, each of the ridgelines which are burr-removal objects is denoted by a correcting expression numeral i, and correcting transformation processing corresponding to the correcting expression numeral i is carried out. In this embodiment, however, for facilitating the explanation, there are presumed the case where no correcting transformation processing is conducted (the correcting expression numeral=−1), and the case where correcting expression numerals 1 to 3 are assigned to the above-described correcting methods 1 to 3, respectively. As shown in the illustration, when the correcting expression numeral is '−1', the sequence of designed command passing points $\underline{x}_1, \underline{x}_2, \ldots, \underline{x}_n$ are used, as they are, as the sequence of command passing points $y_1, y_2, \ldots, y_n$ corresponding to the real position of the ridgeline. Further, when the correcting expression numeral is one of 1 to 3, the associated correcting transformation processing is carried out. For instance, when a search object is a plane, the search command is executed three times to obtain real positions $\underline{s}_1, \underline{s}_2$ and $\underline{s}_3$, at three designated search points. By a correcting transformation matrix $F_3$ on the basis of these real positions and designed values of the designated search points $\underline{r}_1, \underline{r}_2$ and $\underline{r}_3$, the sequence of command passing points $\underline{x}_1, \underline{x}_2, \ldots, \underline{x}_n$ are transformed into the sequence of command passing points $y_1, y_2 \ldots y_n$. While movement control of the robot 1 is conducted on the basis of this sequence of command passing points $y_1, y_2, \ldots, y_n$, burr-removal operation is performed with respect to the ridgeline.

Basically, three kinds of correcting methods are prepared, as described above, and a suitable correcting method is designated for each of the operational portions in the form of a correcting expression numeral. These methods will be described more specifically below.

Figure 31:
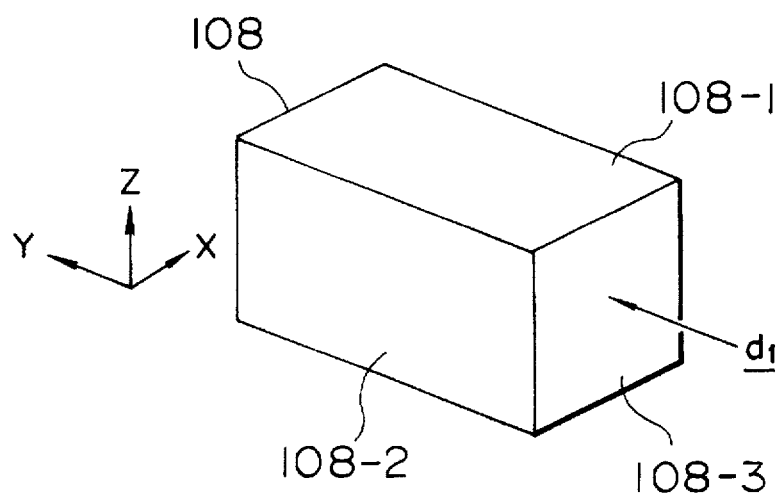
FIG. 31 is a schematic diagram illustrative of calculation of an actual boundary on a workpiece between an unnecessary portion to be removed and the rest of the workpiece on the basis of a measured actual position of one point on the workpiece.

First, there will be explained the case where the correcting expression numeral is '1'. For instance, as shown in FIG. 31 illustrating a workpiece 108, when grinding a ridgeline (indicated by a heavy line) where two surfaces 108-1 and 108-2 machined by an NC machining tool intersect with each other, values from the host processor 3 can be used, as they are, as coordinate values in the X and Z directions. However, when the positional accuracy in the Y direction is not ensured, there is employed a correcting method in which only one search point is used, and only Y direction components of the sequence of command passing points $\underline{x}_1, \underline{x}_2, \ldots, \underline{x}_n$ are shifted to a degree corresponding to a deviation between a real position and a designed value of the workpiece 108 at the point. In this embodiment, with one point on the surface 108-3 serving as a designated search point, search of the designated search point is conducted in a direction of the vector $\underline{d}_1$, i.e., in the +Y direction. As a result, when a measured value at the searched designated search point is denoted by $\underline{q}$, and a designed value supplied from the CAD data is denoted by $\underline{p}$, a point $\underline{y}$ can be obtained from a designed value $\underline{x}$ of a point on the ridgeline through the following correction:

$$\underline{y}=\underline{x}+N*(\underline{q}-\underline{p})$$

N in the expression expresses a matrix for selecting coordinate components of a correction object and is composed of the following elements such that coordinate components in the search direction will be selected. However, it is possible to conduct multiplication intentionally by a matrix for selecting particular coordinate components.

$$N=\begin{pmatrix} \underline{d}\cdot\underline{i} & 0 & 0 \\ 0 & \underline{d}\cdot\underline{j} & 0 \\ 0 & 0 & \underline{d}\cdot\underline{k} \end{pmatrix}$$

Figure 32:
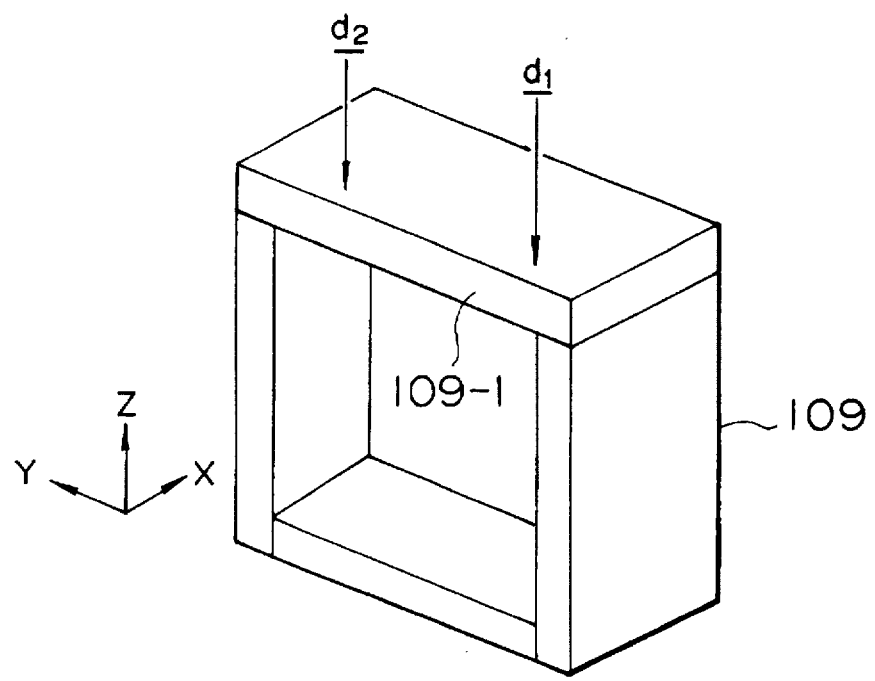
FIG. 32 is a schematic diagram illustrative of calculation of an actual boundary on a workpiece between an unnecessary portion to be removed and the rest of the workpiece on the basis of measured actual positions of two points on the workpiece.

Next, there will be explained the case where the correcting expression numeral is '2'. As shown in FIG. 32 illustrating a can product 109, when a surface 109-1 is machined by the NC machining tool and a ridgeline (indicated by a heavy line) on the surface 109-1 is ground, a value from the host processor can be used, as it is, as a coordinate component perpendicular to the surface to be ground, i.e., the X component. However, since it is a welded article, accuracy of the other coordinate components is not ensured so that correction will be necessary. In such a case, correction by only one-point search is performed for the Y component. For the Z component, two-point search is performed in directions of vectors $\underline{d}_1$ and $\underline{d}_2$ shown in FIG. 32, and then, correction is conducted in the following manner.

That is to say, when designed values of two designated search points are denoted by $\underline{r}_1$ and $\underline{r}_2$, measured values at the respective designated search points are denoted by $\underline{s}_1$ and $\underline{s}_2$, a direction vector of a line segment connecting the designed values $\underline{r}_1$ and $\underline{r}_2$ is denoted by $\underline{l}$, and a direction vector of a line segment connecting the measured values $\underline{s}_1$ and $\underline{s}_2$ is denoted by $\underline{l}_s$, these direction vectors $\underline{l}$ and $\underline{l}_s$, are expressed as follows:

$$\underline{l}=\frac{\underline{r}_2-\underline{r}_1}{|\underline{r}_2-\underline{r}_1|}$$

$$\underline{l}_s=\frac{\underline{s}_2-\underline{s}_1}{|\underline{s}_2-\underline{s}_1|}$$

Figure 33:
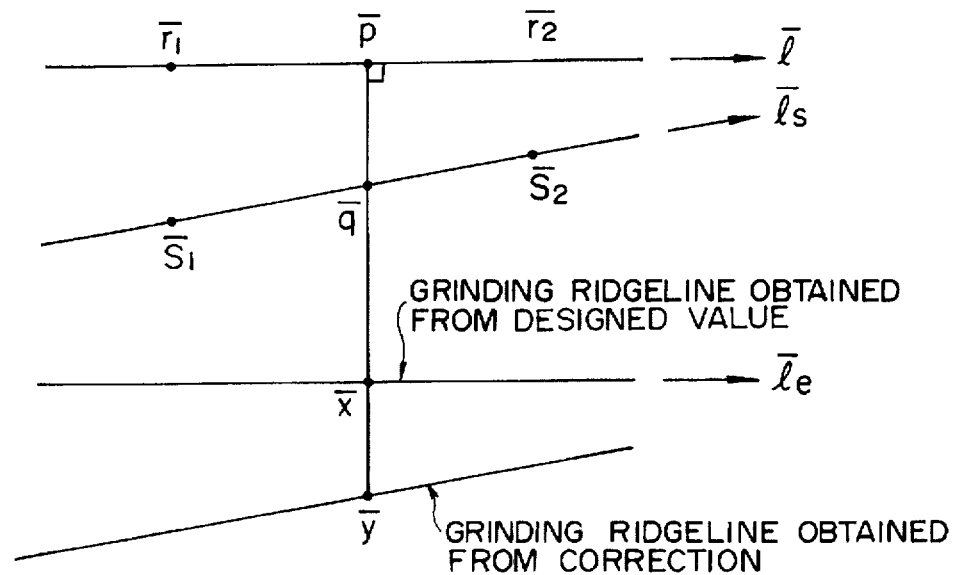
FIG. 33 is a diagram for explaining a principle when calculating an actual boundary on a workpiece between an unnecessary portion to be removed and the rest of the workpiece on the basis of measured actual positions of two points on the workpiece and a specified boundary on the workpiece between the unnecessary portion to be removed and the rest of the workpiece (i.e., a specified position of the unnecessary portion on a desired shape of the workpiece)

FIG. 33 is a diagram in which the direction vectors $\underline{l}$ and $\underline{l}_s$, and a direction vector $\underline{l}_e$ in parallel to the ridgeline to be ground are displaced in parallel onto a plane including two search direction vectors. When a perpendicular line from a designed point $\underline{x}$ on the ridgeline reaches a line segment l at a point $\underline{p}$, and a line segment xp and a line segment $l_s$ intersect at a point $\underline{q}$, the following relations are established:

$$\underline{p}=((\underline{x}-\underline{r}_1)\cdot\underline{l})\underline{l}+\underline{r}_1$$

$$(\underline{q}-\underline{p})\cdot\underline{l}=0$$

$$\underline{q}=\alpha\underline{l}_s+\underline{s}_1$$

From these relations, $\alpha$ is expressed as follows:

$$\alpha=\frac{(\underline{p}-\underline{s}_1)\cdot\underline{l}}{\underline{l}_s\cdot\underline{l}}$$

By the way, the points $\underline{p}$ and $\underline{q}$ are those points on the line segment connecting the designed values $\underline{r}_1$ and $\underline{r}_2$ and the line segment connecting the measured values $\underline{s}_1$ and $\underline{s}_2$, respectively, which correspond to the point $\underline{x}$ to be corrected. Consequently, after obtaining a deviation between these points $\underline{p}$ and $\underline{q}$, the point $\underline{x}$ to be corrected is shifted to a point $\underline{y}$ by the above-described expression $\underline{y}=\underline{x}+N*(\underline{q}-\underline{p})$.

Figure 34:
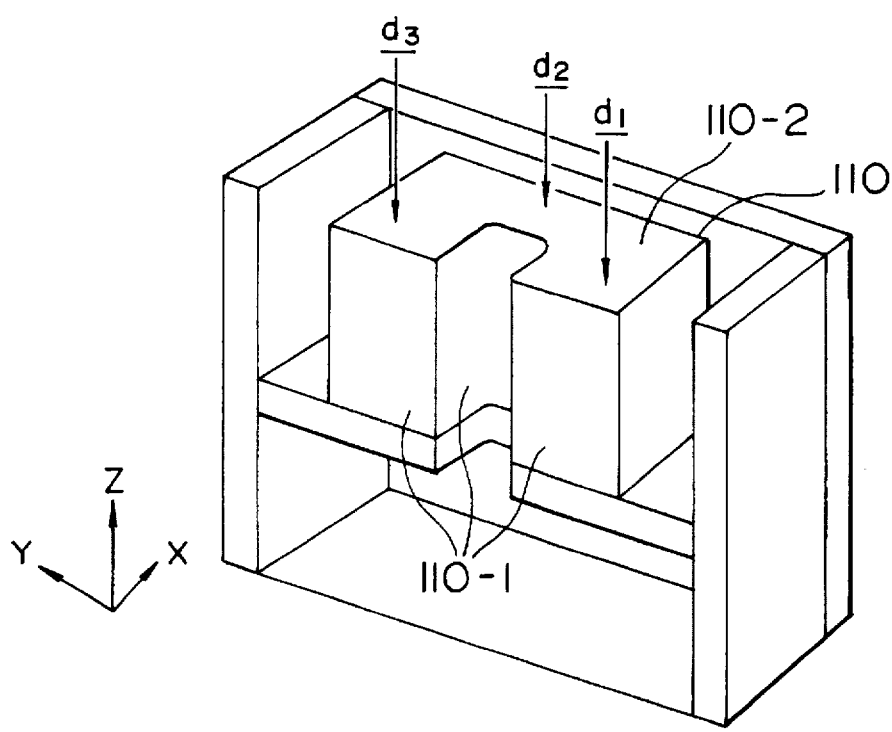
FIG. 34 is a schematic diagram illustrative of calculation of an actual boundary on a workpiece between an unnecessary portion to be removed and the rest of the workpiece on the basis of measured actual positions of three points on the workpiece.

Moreover, there will be explained the case where the correcting expression numeral is '3'. As shown in FIG. 34 illustrating a can product 110, when a surface 110-1 is machined by the NC machining tool and a real inclination value of a surface 110-2 on which a ridgeline (indicated by a heavy line) exists is different from a designed value, it is necessary to obtain the real inclination value of the surface 110-2. For this purpose, after specifying three designated search points on a surface 110-2 on the basis of designed values, these designated search points are searched from a normal direction on the surface 110-2 to directions of vectors $\underline{d}_1$, $\underline{d}_2$ and $\underline{d}_3$, i.e., in the -Z direction, so that the points on the ridgeline will be corrected in the following manner.

Figure 35:
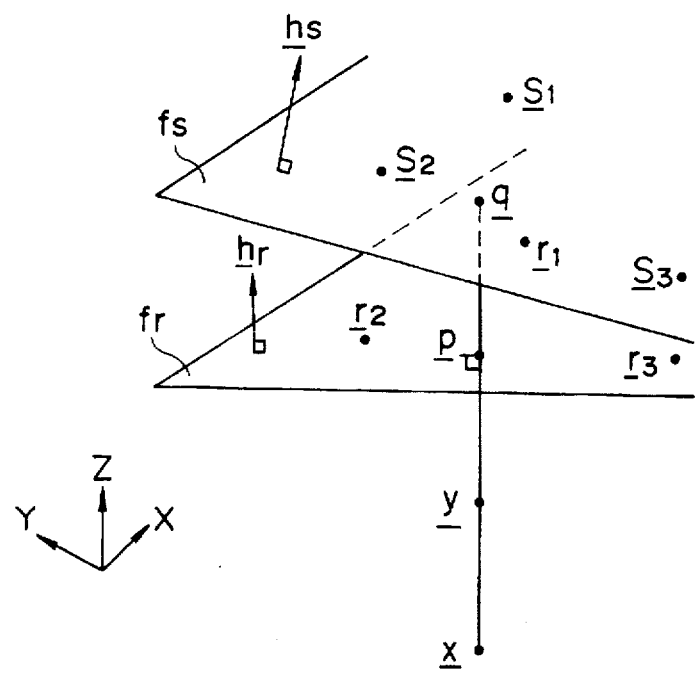
FIG. 35 is a diagram for explaining a principle when calculating an actual boundary on a workpiece between an unnecessary portion to be removed and the rest of the workpiece on the basis of measured actual positions of three points on the workpiece and a specified boundary on the workpiece between the unnecessary portion to be removed and the rest of the workpiece (i.e., a specified position of the unnecessary portion on a desired shape of the workpiece)

More specifically, as shown in FIG. 35, when measured values of the three searched designated search points are respectively denoted by $\underline{S}_1$, $\underline{S}_2$ and $\underline{S}_3$, designed values of the three designated search points are respectively denoted by $\underline{r}_1$, $\underline{r}_2$ and $\underline{r}_3$, a plane defined by the measured values $\underline{S}_1$, $\underline{S}_2$ and $\underline{S}_3$ is denoted by $f_s$, a plane defined by the designed values $\underline{r}_1$, $\underline{r}_2$ and $\underline{r}_3$ is denoted by $f_r$, a normal vector on the plane $f_s$ is denoted by $\underline{h}_s$, and a normal vector on the plane $f_r$ is denoted by $\underline{h}_r$. $\underline{h}_s$ and $\underline{h}_r$ can be obtained in the following manner:

$$\underline{h}_s = \frac{(\underline{s}_2 - \underline{s}_1) \times (\underline{s}_3 - \underline{s}_1)}{(\underline{s}_2 - \underline{s}_1) \times (\underline{s}_3 - \underline{s}_1)}$$

$$\underline{h}_r = \frac{(\underline{r}_2 - \underline{r}_1) \times (\underline{r}_3 - \underline{r}_1)}{(\underline{r}_2 - \underline{r}_1) \times (\underline{r}_3 - \underline{r}_1)}$$

When a perpendicular line drawn from a point $\underline{x}$ on the ridgeline toward the plane $f_r$ intersects the plane $f_r$ at a point $\underline{p}$, the following relational expressions are established:

$$(\underline{p} - \underline{r}_1) \cdot \underline{h}_r = 0$$

$$(\underline{p} - \underline{x}) \times \underline{h}_r = 0$$

Consequently, the point $\underline{x}$ can be obtained from these expressions in the following manner:

$$\underline{p} = \underline{x} - (\underline{h}_r \cdot \underline{x})\underline{h}_r + (\underline{r}_1 \cdot \underline{h}_r)\underline{h}_r$$

Also, when a straight line drawn from the point $\underline{x}$ through the point $\underline{p}$ toward the plane $f^o$ intersects the plane $f_s$ at a point $\underline{q}$, the following relational expressions are established:

$$(\underline{q} - \underline{p}) \times \underline{h}_r = 0$$

$$(\underline{q} - \underline{s}_1) \cdot \underline{h}_s = 0$$

Therefore, the point $\underline{q}$ can be obtained from these expressions in the following manner:

$$\underline{q} = \frac{(\underline{s}_1 \cdot \underline{h}_s)\underline{h}_r + (\underline{h}_s \cdot \underline{h}_r)\underline{p} - (\underline{h}_s \cdot \underline{p})\underline{h}_r}{(\underline{h}_s \cdot \underline{h}_r)}$$

Thus, after obtaining a deviation between these points $\underline{p}$ and $\underline{q}$, the point $\underline{x}$ on the ridgeline which is a correction object is shifted to a point $\underline{y}$ by the above-described expression $\underline{y} = \underline{x} + N^*(\underline{q} - \underline{p})$.

Figure 36:
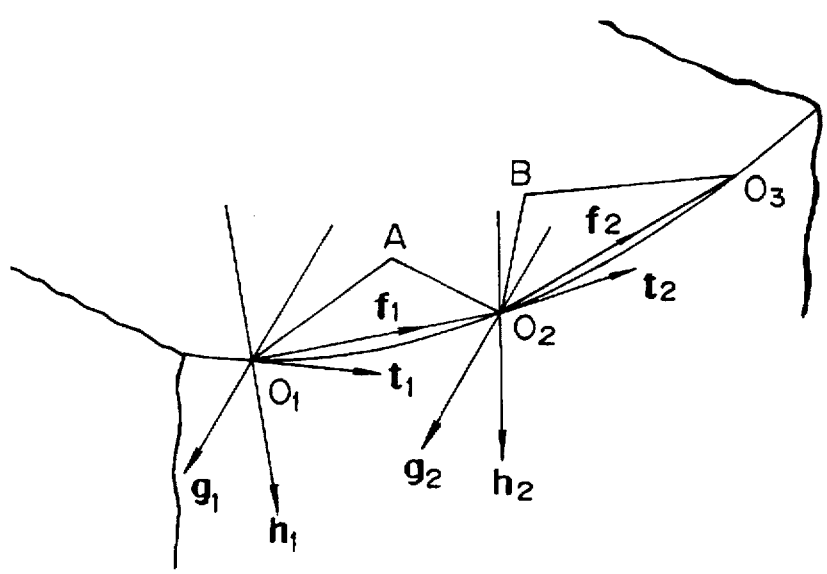
FIG. 36 is a schematic perspective view showing a directional vector expressing a posture of a tool which is required for controlling of a robot when dividing a specified boundary on a workpiece between an unnecessary portion to be removed and the rest of the workpiece (i.e., a specified position of the unnecessary portion on a desired shape of the workpiece or a path where the tool passes to remove the unnecessary portion on the workpiece) into a plurality of sections, interpolating a cubic curve between opposite ends of each of the division sections, and controlling the robot on the basis of a plane defined by one point of a surface of the desired shape of the workpiece in the vicinity of each of the plurality of sections and the opposite ends of the division section, and the cubic interpolation curve.
Figures 37, 38:
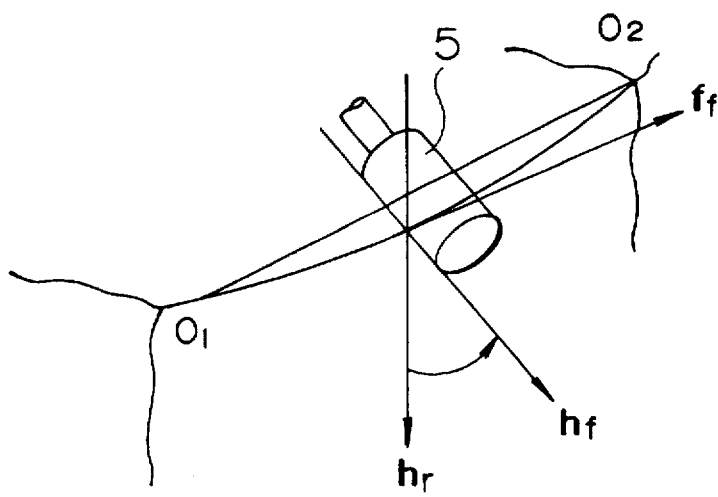
FIG. 37 shows coefficients of the cubic curves shown in FIG. 36 and directional vectors expressing normal lines on the plane which is defined by one point on the surface of the desired shape of the workpiece in the vicinity of each of the plurality of sections and the opposite ends of the division section.
FIG. 38 is a schematic perspective view illustrative of rotation of a directional vector expressing a posture of a tool for forming a surface of a workpiece inclined at a desired angle with respect to a coordinate system which defines a desired shape of the workpiece.

A method of calculating a movement path of a tool and its posture which are required for controlling robot operation on the basis of a designed shape of a workpiece while performing correction corresponding to a designed shape of at least one surface of the workpiece which extends from an unnecessary portion of the workpiece to be removed will now be described with reference to FIGS. 36 to 38.

Since a portion of the workpiece from which burrs are to be removed is located along a ridgeline which is a boundary (a connecting line) between two surfaces of the workpiece (a shape of the path is an arbitrary curve), a grinding portion of a burr removing tool must be moved along the ridgeline while it is pressed against the ridgeline, and perform chamfering grinding at a certain angle with respect to at least one surface of the workpiece which extends from the burrs. For this purpose, path instruction data supplied to the robot are produced in the following method.

That is to say, that ridgeline (the boundary between the unnecessary portion to be removed and the rest of the workpiece) on the designed shape of the workpiece from which burrs are to be removed is divided into segments. One of the two workpiece surfaces extending from the ridgeline is selected for specifying a chamfering angle, and a point is virtually determined, for each of the segments, on the selected workpiece surface on the designed shape of the workpiece in the vicinity of the segment, so that a triangle will be defined by both end positions of the segment and this point. More specifically, as shown in FIG. 36, points A and B are determined for segments $O_1-O_2$ and $O_2-O_3$, respectively, thereby defining triangles $\Delta O_1AO_2$ and $\Delta O_2BO_3$. A normal line on each of these triangles $\Delta O_1AO_2$ and $\Delta O_2BO_3$ is regarded as a normal line on the workpiece surface on the designed shape of the workpiece in the vicinity of each of the segments. After that, in each of the segments, a unit vector $f_v$ expressing a direction of a straight line which connects both ends of the segment (the suffix $_v$ is a vector indication, and such indications will be similarly used below), a unit vector $h_v$ expressing a direction of a normal line on the workpiece surface in the vicinity of the segment, and a unit vector $g_v$ expressing a direction perpendicular to these unit vectors $f_v$, $h_v$ are determined. Thus, rectangular coordinate systems $O_1-f_{1v}g_{1v}h_{1v}$, $O_2-f_{2v}g_{2v}h_{2v}$ are respectively determined corresponding to the segments $O_1-O_2$ and $O_2-O_3$. The $f_v$ direction corresponds to the x axis, the $g_v$ direction corresponds to the y axis, and the $h_v$ direction corresponds to the z axis. The shape of each of the segments is approximated by an algebraic curve. This will be described in relation to the rectangular coordinate system $O_1-f_{1v}g_{1v}h_{1v}$. Directions of tangential lines at the points $O_1$ and $O_2$ are denoted, respectively, by $t_{1v}$ and $t_{2v}$, and algebraic curves having the tangential lines at the points $O_1$ and $O_2$ are determined as follows:

$$y = a_y x^3 + b_y x^2 + C_y x$$

$$z = a_z x^3 + b_z x^2 + C_z x$$

wherein a unit of the length is a length of the segment $O_1-O_2$. In this case, the following relation is established between coefficients of the algebraic curves:

$$a_{y1} + b_{y1} + C_{y1} = 0$$

$$c_{y1} = t_1 \cdot g_1 / t_1 \cdot f_1$$

$$3a_{y1} + 2b_{y1} + c_{y1} = t_2 \cdot g_1 / t_2 \cdot f_1$$

Concerning other coefficients $a_z$, $b_z$, $c_z$, substantially the same relation is established. Therefore, by solving these relational expressions, a cubic function defining a curve interpolated between both ends of the segment is univocally determined. When the above-described processing is performed for each of the other segments, a coefficient of a cubic algebraic equation expressing an approximate curve of the ridgeline is determined for the segment. By the way, when a cubic curve is set for each of the segments, as described above, the cubic curve passes the end portion of the segment, so that if tangential lines at end portions of curves which approximate shapes of two adjacent segments have the same direction, the curves which approximate the shapes of the two segments will be continuous with each other at the end portions. In a specifying method of path instruction data for the robot, when burr removal is performed along a curve connecting points $O_1$, $O_2$ and $O_3$, for example, the path instruction data will be specified in the robot drive/control means 2 in a data form shown in FIG. 37. In this data form, O denotes a position of a starting point of a segment, $a_y$, $b_y$, $c_y$, $a_z$, $b_z$, $c_z$ denote coefficients of cubic functions defining curves which are interpolated between both ends of the segment, and $d_x$, $d_y$, $d_z$ denote components of a unit vector expressing a normal direction of the workpiece surface in the vicinity of the segment.

When the path instruction data in such a data form are specified in the robot drive/control means 2, a control command value for the robot 1 is calculated in the robot drive/control means 2 so as to drive and control the tool along the interpolation curve. That is to say, for each of the segments defined in the input means 3, the positions of points where the tool is to pass (passing points) at each sampling time (at predetermined intervals) are determined. In accordance with a designated tool movement speed, distances between the passing points are changed. If the passing point thus determined is on the rectangular coordinate system $O_1\text{-}f_{1\nu}g_{1\nu}h_{1\nu}$ and its X axis coordinate value is $p_f$ and when a direction of a tangential line of an algebraic curve at the position of the passing point is a vector $f_{f\nu}$, it has a component of $(1, 3a_{y1}p_f^2+2b_{y1}p_f^1+c_{y1}, 3a_{z1}p_f^2+2b_{z1}p_f^1+c_{z1})$ on the rectangular coordinate system $O_1\text{-}f_{1\nu}g_{1\nu}h_{1\nu}$. Consequently, after it is set as a unit vector, it is transformed into a unit vector in a reference coordinate system (e.g., the workpiece coordinate system or the jig coordinate system or the robot coordinate system). Although a reference direction for a chamfering angle is $h_{1\nu}$, the ridgeline may be a curve in a three-dimensional space. Therefore, since $f_{f\nu}$ and $h_{1\nu}$ are not necessarily at a right angle, the following vector $h_{f\nu}$ is introduced as a new reference direction:

$$h_{f\nu} = f_{f\nu} \times g_1 / |f_{f\nu} \times g_1|$$

When the segment is short enough, a difference between $f_{1\nu}$ and $f_{f\nu}$ is not large, so that the above expression is established. As shown in FIG. 38, a rotational axis direction of the burr removing tool 5 is such that the reference direction $h_{f\nu}$ is rotated about the $f_{f\nu}$ axis in accordance with a predetermined chamfering angle. The axial direction of the burr removing tool 5 thus obtained is denoted by $h_{f\nu}$, and a vector $g_{f\nu}$ ($=h_{f\nu} \times f_{f\nu}$) in a direction toward the workpiece is determined, so that ($f_{f\nu}$, $g_{f\nu}$, $h_{f\nu}$) will be a target value of the posture of the burr removing tool 5. A target value of the position $P_{f\nu}$ is $(p_x, a_{y1}p_x+b_{y1}p_x+c_{y1}p_x, a_{z1}p_x+b_{z1}p_x+c_{z1}p_x)$ on the rectangular coordinate system $O_1\text{-}f_{1\nu}g_{1\nu}h_{1\nu}$. At the time of burr removal, a predetermined speed is specified in the $f_{f\nu}$ direction. On the other hand, in the $g_{f\nu}$ direction, power applied to the burr removing tool 5 is detected by the power sensor 6, so that pressing control with a certain force or compliance control will be performed on the basis of this detection result.

Finally, the calculation procedure at the time of actual drive control in the robot drive/control means 2 will be described. First, a target position of a passing point is determined through linear interpolation operation as a point which the tool is to reach from the point $O_1$ at each sampling time in accordance with a distance from the point $O_1$ (a coordinate value on the X coordinate axis) which is specified on the segment $O_1\text{-}O_2$ on the basis of a designated speed command value. When this point is denoted by P, a tangential direction of a point on an algebraic curve corresponding to the point P can be calculated from $(1, 3a_{y1}p_f^2+2b_{y1}p_f^1+c_{y1}, 3a_{z1}p_f^2+2b_{z1}p_f^1+c_{z1})$ described above. After that, a vector $h_{f\nu}$ expressing a reference direction for a chamfering angle is determined from the above-mentioned expression. Then, the vector $h_{f\nu}$ expressing the tool posture reference direction is rotated for a specified chamfering angle around the tangential vector $f_{f\nu}$. Therefore, the drive control of the robot is carried out while using the coordinate $P_\nu$, $(f_{f\nu}, g_{f\nu}, h_{f\nu})$ as position and posture target data of the burr removing tool 5. At that time, a control command value in the $g_{f\nu}$ direction is determined on the basis of the detection result of the power sensor 6 so as to press the burr removing tool 5 with a certain force. Such drive control is not limited to the burr-removal operation, but can be applied similarly to finishing operation with respect to the ridgeline.

What is claimed is:

1. A robot for removing an undesired portion of a workpiece, comprising:

a tool for removing said undesired portion;

a tool positioning means operable with respect to a reference coordinate system, said tool positioning means carrying said tool attached thereon, and being movable to change a position and a posture of said tool with respect to said reference coordinate system;

a jig means on which said workpiece is securely fixed to maintain a desired position and a desired posture of said workpiece with respect to said reference coordinate system of said tool positioning means; and an arithmetic means for calculating a movement path and a posture of said tool moved by said tool positioning means on a basis of a position of said undesired portion on a desired shape of said workpiece, said arithmetic means correcting the movement path and the posture of said tool based on at least one of a shape of the workpiece other than said position of said undesired portion, a diameter of said tool, an outer-shape-angle of said tool, and a surface shape of the jig means on which the workpiece is fixed.

2. A robot according to claim 1, wherein a calculated movement path and a calculated posture of said tool as calculated by said arithmetic means are corrected taking into consideration a shape said tool which is actually used.

3. A robot according to claim 1, wherein the shape of said tool to be actually employed is a positional relation between a part of said tool which advances in a course along a boundary between said undesired portion of said workpiece to be removed and a remainder of said workpiece, and said tool positioning means.

4. A robot according to claim 1, wherein a calculated movement path and a calculated posture of said tool as calculated by said arithmetic means are corrected taking into consideration a shape of said jig means on which said workpiece is fixed, with respect to said reference coordinate system.

5. A robot according to claim 4, wherein the shape of said jig means on which said workpiece is fixed with respect to said reference coordinate system in a position and a posture of said jig means with respect to said reference coordinate system.

6. A robot according to claim 1, wherein a calculated movement path and a calculated posture of said tool are corrected taking into consideration an actual shape of said workpiece.

7. A robot according to claim 6, wherein the actual shape of said workpiece is an actual position on said reference coordinate system, of a line on a surface of said workpiece which extends from said undesired portion.

8. A robot according to claim 6,
wherein the actual shape of said workpiece is an actual position on said reference coordinate system, of a surface of said workpiece which extends from said undesired portion.

9. A robot according to claim 6,
wherein the actual shape or condition of said workpiece is an actual position of said workpiece on said reference coordinate system.

10. A robot according to claim 6,
wherein the actual shape of said workpiece is an actual position of said desired portion of said workpiece on said reference coordinate system.

11. A robot according to claim 1,
wherein a calculated movement path and a calculated posture of said tool are corrected taking into consideration a desired shape of a surface of said workpiece which extends from said undesired portion.

12. A robot according to claim 11,
wherein the desired shape of the surface of said workpiece which extends from said undesired portion is a posture, with respect to said reference coordinate system, of a virtual plane formed by two points which are contained in said undesired portion on the desired shape of the surface of said workpiece and one point in a vicinity of said undesired portion on the desired shape of the surface of said workpiece.

13. A robot according to claim 1,
wherein after producing a file in which a position of said undesired portion on said desired shape of said workpiece is recorded, the movement path and the posture of said tool are calculated on a basis of the position of said undesired portion on said desired shape of said workpiece which is recorded in said file, while performing the correction.

14. A robot according to claim 1,
wherein said arithmetic means virtually divides said undesired portion on said workpiece into a plurality of sections and calculates respective positions of ends of the plurality of sections, the movement path and the posture of said tool between said ends, for removing each of the plurality of sections while the correction.

15. A robot according to claim 6,
wherein the actual shape of said workpiece is an actual position on said reference coordinate system, of a point on a surface of said workpiece which extends from said undesired portion.

16. A robot according to claim 14,
wherein when said undesired portion on said workpiece is arcuate, said undesired portion is divided virtually into a plurality of sections and respective positions of ends of each of the plurality of sections are calculated, and wherein angles defined between virtual lines connecting the respective positive of ends of the plurality of sections with a center of an arc are not more than a predetermined angle.

17. A robot according to claim 14,
wherein the movement path and the posture of said tool between the ends for removing each of the plurality of sections are corrected taking into consideration an actual shape of said workpiece.

18. A robot according to claim 14,
wherein the movement path and the posture of said tool between the ends for removing each of the plurality of sections are corrected taking into consideration said desired shape of the workpiece to be obtained after removing said undesired portion, and the shape of at least one of said workpiece, said tool and said jig means.

19. A robot according to claim 1,
wherein the movement path and the posture of said tool are calculated on a basis of the position of said undesired portion on said desired shape of said workpiece and desired shape of said workpiece to be obtained after removing said undesired portion, while performing the correction.

20. A robot according to claim 1,
wherein the position of said undesired portion on the desired shape of said workpiece is determined on a workpiece shape file data formed by a CAD system.

21. A robot according to claim 1,
wherein the movement path of said tool between a start of an undesired portion removal operation and an end thereof is corrected before the start of the undesired portion removal operation.

22. A robot for removing an undesired portion of a workpiece, comprising:
a tool for removing said undesired portion;
a tool positioning means operable with respect to a reference coordinate system, said tool positioning means carrying said tool attached thereon, and being movable to change a position and a posture of said tool with respect to said reference coordinate system;
a jig means on which said workpiece is securely fixed to maintain a desired position and a desired posture of said workpiece with respect to said reference coordinate system of said tool positioning means, and
an arithmetic means for calculating a movement path and a posture of said tool moved by said tool positioning means on a basis of a position of said undesired portion on a desired shape of said workpiece
said arithmetic means corrects the movement path and the posture of said tool based on the diameter of said tool and the angle of inclination of said tool.

23. A robot for removing an undesired portion of a workpiece, comprising:
a tool for removing said undesired portion;
a tool positioning means operable with respect to a reference coordinate system, said tool positioning means carrying said tool attached thereon, and being movable to change a position and a posture of said tool with respect to said reference coordinate system;
a jig means on which said workpiece is securely fixed to maintain a desired position and a desired posture of said workpiece with respect to said reference coordinate system of said tool positioning means; and
an arithmetic means for calculating a movement path and a posture of said tool moved by said tool positioning means on a basis of a position of said undesired portion on a desired shape of said workpiece,
said arithmetic means correcting the movement path and the posture of said tool based on at least one of a diameter of said tool, an outer-shape-angle of said tool, and a surface shape of the jig means on which the workpiece is fixed.

* * * * *